(12) United States Patent
Hanafusa

(10) Patent No.: US 7,435,171 B2
(45) Date of Patent: Oct. 14, 2008

(54) CARD MANAGEMENT METHOD AND APPARATUS FOR NETWORK CARD GAME

(75) Inventor: Motohiro Hanafusa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/002,881

(22) Filed: Dec. 3, 2004

(65) Prior Publication Data

US 2005/0079912 A1  Apr. 14, 2005

Related U.S. Application Data

(63) Continuation of application No. PCT/JP02/05806, filed on Jun. 11, 2002.

(51) Int. Cl.
  *G06F 17/00* (2006.01)
(52) U.S. Cl. .......................... 463/11; 463/29
(58) Field of Classification Search ............ 463/9, 463/11, 29, 42, 43, 19; 273/244, 245; 705/26
See application file for complete search history.

(56) References Cited

U.S. PATENT DOCUMENTS

| | | | | |
|---|---|---|---|---|
| 5,662,332 | A  * | 9/1997 | Garfield ....................... | 273/308 |
| 5,846,132 | A  * | 12/1998 | Junkin ......................... | 463/42 |
| RE37,957 | E  * | 1/2003 | Garfield ....................... | 273/308 |
| 6,554,702 | B2 * | 4/2003 | Mahar et al. .................. | 463/11 |
| 6,745,236 | B1 * | 6/2004 | Hawkins et al. ............. | 709/218 |
| 6,892,064 | B2 * | 5/2005 | Qi et al. ....................... | 455/408 |
| 2001/0008852 | A1 | 7/2001 | Izumi ........................... | 463/42 |
| 2001/0039206 | A1 * | 11/2001 | Peppel .......................... | 463/31 |
| 2002/0052238 | A1 * | 5/2002 | Muroi ........................... | 463/40 |
| 2002/0155893 | A1 * | 10/2002 | Swanberg et al. ............. | 463/43 |
| 2002/0161666 | A1 * | 10/2002 | Fraki et al. .................... | 705/26 |
| 2003/0004887 | A1 * | 1/2003 | Roszak ......................... | 705/57 |

FOREIGN PATENT DOCUMENTS

| | | |
|---|---|---|
| JP | 2000-157724 | 6/2000 |
| JP | 2000-176163 | 6/2000 |
| JP | 2001-062151 | 3/2001 |
| JP | 2001-170366 | 6/2001 |
| JP | 2001-259227 | 9/2001 |
| JP | 2001-259228 | 9/2001 |
| JP | 2001-312602 | 11/2001 |
| JP | 2002-123770 | 4/2002 |
| JP | 2002-136766 | 5/2002 |

* cited by examiner

*Primary Examiner*—John M Hotaling, II
*Assistant Examiner*—Dat Nguyen
(74) *Attorney, Agent, or Firm*—Staas & Halsey LLP

(57) ABSTRACT

A network card game in which a user purchases actual trading cards from a game planning company via a store or cellular phone agency. The user can transfer ownership of the card in a virtual card game space established by a service provider, separately from the actual trading cards. The card transfer In the virtual card game space enables the release of damaged cards which were damaged in a network card game, in addition to granting a point to a transfer source person. When the card is transferred to a friend, for example, and returned from the friend immediately after the transfer, the state of the damaged card returns to the normal state, and It becomes possible to use the card in a game soon. If logs of the transfer process are held, they can be used for various marketing.

15 Claims, 22 Drawing Sheets

| TRANSFER SOURCE | TRANSFER DESTINATION | CARD ID | DATE AND TIME | CHARGES | PERSON TO BE CHARGED |
|---|---|---|---|---|---|
| U001 | U002 | C51 | 2002.04.01.15:30 | 50 | U001 |
| U002 | U003 | C48 | 2002.04.01.15:40 | 0 | AD A |
| U002 | U001 | C51 | 2002.04.01.15:45 | 50 | U001 |
| ⋮ | ⋮ | ⋮ | ⋮ | ⋮ | ⋮ |

| USER ID | USER NAME | SUBSCRIBER ID | TEL. NO | MAIL ADDRESS | REGISTERED AGENCY ID | GAME UTILIZING FEE | CURRENT VALUE OF POTLATCH POINT | ACCUMULATED VALUE OF POTLATCH POINT | POSSESSED CARD ID |
|---|---|---|---|---|---|---|---|---|---|
| U0001 | ICHIRO YAMADA | 1234ABCD | 0123456789 | yamichi@nf.co.jp | AG0001 | 998 | 5555 | 6666 | C01, C03, C51 |
| U0002 | ICHIRO YAMAMOTO | 1234ABCE | 0123456788 | yamam@nf.co.jp | AG0001 | 996 | 4444 | 4444 | C73, C63 |
| U0003 | ICHIRO SUZUKI | 1234ABCF | 0123456787 | suzuichi@nf.co.jp | AG0002 | 994 | 3333 | 5553 | C48, C49, C50, C52 |
| U0004 | TARO SUZUKI | 1234ABCG | 0123456786 | suzutaro@nf.co.jp | AG0002 | 992 | 2222 | 2222 | C02, C06 |

FIG.7

| CARD ID | TYPE ID | CARD NAME | DISTRIBUTION STATUS | CARD RARITY | CARD LEVEL | POSSESSING USER ID | STATUS IN GAME | DECK INSTALLATION FLAG | ATTRIBUTE |
|---|---|---|---|---|---|---|---|---|---|
| C01 | TY01 | CHARACTER A | USER HOLDING | 10000 | 5 | U001 | NORMAL | YES | FIRE |
| C02 | TY02 | CHARACTER B | USER HOLDING | 500 | 3 | U097 | DEAD | NO | WATER |
| C03 | TY03 | CHARACTER C | USER HOLDING | 200 | 2 | U001 | CURSED | YES | EARTH |
| ... | ... | ... | ... | ... | ... | ... | ... | ... | ... |
| C50 | TY02 | CHARACTER F | BEFORE TRANSFER | 50000 | 4 | U003 | NORMAL | NO | FIRE |
| C51 | TY01 | CHARACTER G | USER HOLDING | 100 | 1 | U001 | DEAD | NO | EARTH |
| ... | ... | ... | ... | ... | ... | ... | ... | ... | ... |

| 645 | 646 | 647 | 648 | 649 |
|---|---|---|---|---|
| AGENCY ID | OWNER ID | POINTER OF REGISTERED USER TABLE | TOTAL UTILIZING AMOUNT OF REGISTERED USERS | INCENTIVE |
| AG0001 | OW101 | FFFF | 99999 | 3333 |
| AG0002 | OW101 | FFFG | 88888 | 2222 |
| ⋮ | ⋮ | ⋮ | ⋮ | ⋮ |

FIG.9

| 650 | 651 | 652 | 653 | 654 |
|---|---|---|---|---|
| USER ID | USER NAME | UTILIZING FEE | HOLDING FLAG | IDs OF CARDS BEING HELD |
| U0001 | ICHIRO YAMADA | 998 | Yes | ID=111111<br>ID=111211 |
| U0002 | ICHIRO YAMAMOTO | 996 | No | |
| ⋮ | ⋮ | ⋮ | ⋮ | ⋮ |
| TOTAL | 999 PERSONS | 99999 YEN | | |

FIG.10

| 661 | 662 | 663 |
|---|---|---|
| OWNER ID | AFFILIATED AGENCY ID | TOTAL INCENTIVE |
| OW101 | AG0001 | 5555 |
| | AG0002 | |
| ⋮ | ⋮ | ⋮ |

FIG.11

| 665 | 666 | 667 | 668 |
|---|---|---|---|
| OPPONENT A | OPPONENT B | DATE | WINER |
| U0001 | U0002 | 2002.07.30 | U0001 |
| U0002 | U0003 | 2002.07.31 | U0002 |
| ⋮ | ⋮ | ⋮ | ⋮ |

FIG.12

CARD MANAGEMENT METHOD AND APPARATUS FOR NETWORK CARD GAME

CROSS-REFERENCE TO RELATED APPLICATIONS

This application is a continuing application, filed under 35 U.S.C. section 111(a), of International Application PCT/JP02/05806, filed Jun. 11, 2002.

TECHNICAL FIELD OF THE INVENTION

The present invention relates to a technique for games using a network, and more particularly to a technique for card games using a network.

BACKGROUND OF THE INVENTION

Trading cards are cards having various figures printed thereon, and they are targeted for collection and/or used for card games. The trading cards are sold in such a style that a predetermined number of cards out of many kinds of cards in the same series are randomly packaged. Then, when a user obtains duplicative cards, he or she can exchange one of the duplicative cards to another card of another user, whereby the user can enrich his or her holding cards. Incidentally, a market is established for popular trading cards, and cards that are dealt at a high price exist.

A way of playing trading cards is different among game planning companies or selling companies. However, fundamentally, each of plural players brings a predetermined number of cards called as deck and arranges them at predetermined places to fight a battle according to a predetermined rule, thereby having a showdown.

In conventional card games, the games themselves are carried out between parties concerned, and thus it has been difficult for game planning companies or selling companies to have actual playing statuses of games except for a few opportunities such as game tournaments opened under the sponsorship of those companies. Moreover, the game planning companies or selling companies can make profits only when they sell cards. Accordingly, because games rapidly raise or lose their popularity, these companies miss the opportunities of selling the games or are saddled with an extremely large amount of stock, which causes unstable business management of the game planning companies or the selling companies. In addition, because game playing and/or card exchange is dependent on friendship of users in the real world, when there is no card collector of the same series cards around the user concerned, the user has little opportunity of playing a game and/or exchanging a card. Accordingly, there is a problem that the desire of the card collection does not easily rise.

In a video game or game using a network, game enjoying factors are limited to a range which is prepared in advance by a game provider, and when the function of the game itself is scanty, it is extremely difficult to win support from users. Moreover, in order to make users unwearied, it is required to renew the game contents continually, and a large amount of capital investment is needed. Furthermore, some degree of familiarity with the game is needed and thus time and labor are needed. On the other hand, when a user is familiar with the game, the user is bored with the game, and thus it becomes difficult to increase the population of users for the game.

As described above, the conventional card game, video game and the like also have a large problem in continuously acquiring users, and keeping and enlarging users' interests.

For example, JP-A-2000-157724 discloses a technique of accessing a server connected to a network by a game machine to play a game. JP-A-2001-62151 discloses a technique of assigning passwords to items obtained in the game the user played using the game machine, and delivering the items to another user. Furthermore, Laid-open European Patent Application No. 1134008A2 (or JP-A-2001-190849) discloses a technique when game elements are received and delivered between the user of a first game machine and the user of a second game machine. JP-A-2001-259227 discloses a technique of safely and reliably receiving and transmitting objects obtained during a game in a cellular phone communication game system. JP-A-2001-259228 discloses a technique of receiving and delivering objects obtained during a game in a cellular phone communication game system among an unspecified number of users.

SUMMARY OF THE INVENTION

Therefore, an object of the present invention is to provide an information processing technique to realize a card game using a network as a fascinating game.

Furthermore, another object of the present invention is to provide an information processing technique of promoting transfer of cards in a card game using a network.

A card managing method in a network card game according to a first aspect of the present invention to attain the aforementioned objects comprises: a step of, if a registration request of a card is received from a terminal of a user, checking a registration state of the card relating to the registration request by referring to a storage device; and a step of, if it is judged that the registration state of the card relating to the registration request is an unregistered state of a ownership, storing user identification information of the user or the terminal of the user and card identification information of the card relating to the registration request with their association into a storage device. By registering, as his or her own card, a card to which any other user does not register his or her ownership, for example in a computer for a network card game, it becomes possible for the user to enjoy the card game with other users which can connected to the network.

Incidentally, the card managing method according to the first aspect of the present invention may further comprise a step of registering a state change of a used card in accordance with a play state of the game, in a card information storage. The state of the card contains an experience level, which is increased by accumulating experience through battles, a state under which a special effect can affect in battles, or the like.

Moreover, the aforementioned state of the card may contain a damage status, which is held even after the game using the card is finished, and information representing the damage status may be held for the card in the card information storage unless a predetermined condition is satisfied. In the conventional card games, even when a damage status is set in a game, the damage status is released at the time when the game is finished, and the damage status is treated as if it has not existed when another game is played. Here, for example, the damage status is kept until the card under the damage status is transferred to another user, thereby promoting the card transfer.

A card managing method for a network card game according to a second aspect of the present invention comprises: a step of, if a transfer request of a card, which includes a designation of a transfer destination user, is received from a terminal of a user, judging whether an association between identification information of the user or the terminal of the user and identification information of the card relating to the transfer request is registered in a storage device; and if it is judged that at least the association is registered, an transfer registering step of registering in the storage device, an association between identification information of the transfer destination user or the terminal of the transfer destination user and the identification information of the card relating to the transfer request. As described above, only a card whose ownership belongs to the user relating to the transfer request is allowed to be transferred, whereby proper transfer of the cards can be achieved in a network. Accordingly, possessed cards are enriched even in the network, and a battle capability can be enhanced even in games on the network. That is, users' interests can be maintained and enlarged. The ownership of the cards in the network and the ownership of actual cards may exist separately from each other.

In addition, the second aspect of the present invention may further comprise a step of calculating a point value on the basis of at least one of the number of cards relating to the transfer request, a level of the card, rarity of cards and card attribute, and storing the calculated point value or an accumulated point value into a user information storage so as to correspond to the identification information of a transfer source user or the terminal of the transfer source user, if the aforementioned transfer registering step is carried out. By allocating such a point value to the transfer source user, the transfer can be promoted. Furthermore, the point value can be used to specify a user who actively transfers cards, and various kinds of advertisements, promotion activities and the like can be effectively performed.

Furthermore, the second aspect of the present invention may further comprise a step of storing the transfer source user, the transfer destination user and information of date and time into a transfer management table, if the aforementioned transfer registering step is carried out. Accordingly, the relationship between the transfer source user and the transfer destination user can be extracted, and various kinds of advertisements, promotion activities and the like can be effectively performed.

For example, it may further comprise a step of extracting from the aforementioned transfer management table, data representing that the same card is transferred between the same users within a predetermined period. Accordingly, the close relationship between the users can be found.

Still furthermore, the second aspect of the present invention may further comprise a step of initializing at least a part of a card state registered in the card information storage so as to correspond to the transferred card, and storing the initialized card state into the card information storage, if the aforementioned transfer registering step is carried out. For example, by transferring a card under a damage status to another person, the damage status can be released. Accordingly, a user temporarily transfers the card to another user having a close connection to the user and then takes over the card again, whereby the card under the damage status can be used under an initial status again. Accordingly, the transfer of cards can be promoted.

The aforementioned card managing method in the network card game can be implemented by a program and a computer. The program is stored in a storage medium or storage device, such as a flexible disk, CD-ROM, a magneto-optical disk, a semiconductor memory, a hard disk or the like. Furthermore, the program may be distributed through a network or the like. An intermediate process result is temporarily stored in a memory.

BRIEF DESCRIPTION OF THE DRAWINGS

FIG. 3 is a diagram showing an outline of the process for the marketing in the embodiment of the present invention;

FIG. 6 is a diagram showing an example of a user table in the embodiment of the present invention;

FIG. 7 is a diagram showing an example of a card table in the embodiment of the present invention;

FIG. 9 is a diagram showing an example of an agency table in the embodiment of the present invention;

FIG. 10 is a diagram showing an example of a registered user table in the embodiment of the present invention;

FIG. 11 is a diagram showing an agency owner table in the embodiment of the present invention;

FIG. 12 is a diagram showing an example of a game win-loss management table in the embodiment of the present invention;

BEST MODE TO CARRYING OUT THE INVENTION

Figure 1:
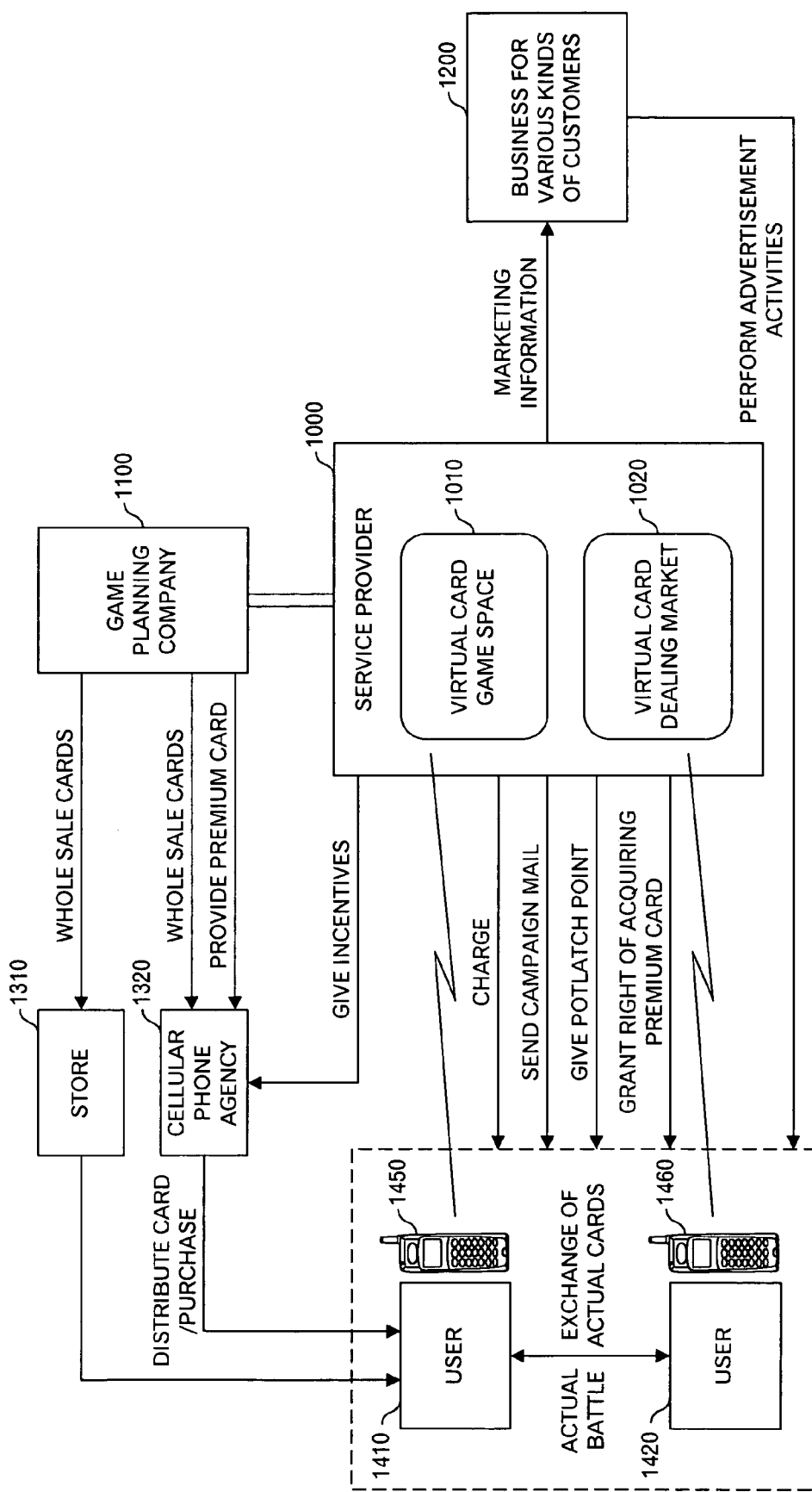
FIG. 1 is a diagram showing an outline of a business in an embodiment of the present invention.

An outline of a business relating to one embodiment of the present invention will be described using FIG. 1.

A service provider 1000 for providing a network card game according to this embodiment of the present invention constructs a card game site in the Internet, for example, and provides a virtual card game space 1010 in which users play games according to predetermined rules. A virtual card dealing market 1020 is also established to transfer or exchange cards and carry out auctions. In addition, the service provider 1000 supplies actual cards in cooperation with a game planning company 1100. The game planning company 1100 settles illustrations of cards, orders print of cards to a predetermined print company, and wholesales the completed cards in the form of packages each including a predetermined number of completed cards in stores 1310 such as toy stores and convenience stores, sales agencies 1320 of cellular phones (hereinafter referred to as cellular phone agencies or merely as agencies) and the like. Moreover, the game planning company 1100 settles the rules of games in the virtual card game space 1010 or the like, and implements the rules to the virtual card game space 1010 with the service provider 1000.

With respect to the cards supplied from the game planning company 1100, a unique ID is given to each card, and cards are specified on the basis of the IDs in the virtual card game space 1010 and/or virtual card dealing market 1020. The cards in this embodiment are substantially the same as the conventional cards except that a unique ID is allocated to each card and information of all the cards is registered on the system. Each card has basic functions as collection, battle, transfer and exchange. That is, many kinds of cards having designs, which promotes collection desire, are provided as collection targets. Moreover, cards are randomly packaged, and some cards having rarity are mixed, so that it is difficult to completely collect all the cards. Card exchange or transfer is carried out because some cards have rarity and the perfect collection of the cards is difficult. With respect to rarity, cards are ranked in accordance with the degree of rarity to further promote collection desire. In addition, a predetermined number of cards are needed in a game (battle), and not only character cards and item cards, but also cards having different functions such as event cards, landform cards are prepared. Moreover, attribute values of attack, defense and special attack (magic) in battles are set and registered so as to correspond to each card. Exchange or transfer of the cards aims to not only perfectly collect the cards as collection articles, but also win the game. Furthermore, there are cases in which users disposes of unnecessary duplicative cards and obtains cards necessary for games or uncollected cards. The worthiness of each card may be judged on the basis of not only its rarity, but also its utility in games.

The store 1310 and/or the cellular phone agency 1320 sells cards to users 1410 and 1420 and the cellular phone agency 1320 distributes cards as special privilege for the purchase of a cellular phone and the like or in order to pull customers. The user 1410 and/or the user 1420 can play a game with obtained actual cards, that is, have a real battle. In addition, duplicative actual cards or the like are exchanged or merely transferred between the user 1410 and the user 1420. Moreover, for example, the user 1410 registers his or her own cards in the virtual card game space 1010 by using a user terminal such as a cellular phone 1450 or the like, and can fight a battle with other users using the virtual card game space 1010. Likewise, the user 1420 also registers his or her own cards in the virtual card game space 1010 by using a user terminal such as a cellular phone 1460 or the like, and can fight a battle with other users using the virtual card game space 1010 and containing the user 1410. In the virtual card game space 1010, information on battle records of games and the like are provided to the users 1410 and 1420.

The users 1410 and 1420 can trade the ownership of cards in the virtual card game space 1010 via the virtual card dealing market 1020. The users 1410 and 1420 can make a trade each other, but also with many other users. Incidentally, here, the description is carried out assuming that a mere transfer of cards between specific users is one of trades through the virtual card dealing market 1020. In addition, the transfer may be carried out with charge or without charge. Moreover, each user can participate in an auction for his or her desired premium card (which is also called as a rare card), for example, at an auction site contained in the virtual card game space 1010, and obtain the premium card concerned if the user makes a successful bid. Furthermore, the transfer of the ownership of a card in the virtual card dealing market 1020 may be carried out separately from the transfer of the actual card.

Incidentally, in this embodiment, in order to use the virtual card game space 1010 and/or the virtual card dealing market 1020, the users 1410 and 1420 must carry out the registration for their game entry to the service provider 1000, and registers the cellular phone agency 1320 as a trade agency when the game entry registration is carried out. As described above, the cellular phone agency 1320 functions as a base station for distribution of actual cards in the network card game, customer services and various kinds of promotion activities. In addition to the above activities, the cellular phone agency 1320 can perform selling of cellular phones and other activities to customers who come to the shop by using this system.

The service provider 1000 can grasp neither the play statuses of the games using actual cards nor the trade of the actual cards, however, it can obtain data on the play statuses of the games in the virtual card game space 1010 and also the card trading status in the virtual card dealing market 1020. In addition, it charges the users 1410 and 1420 with the game utilization fees and/or card transfer service charges, and collects fees and/or charges together with a cellular phone bill or by using other payment means such as the direct charge to the user's bank account or a credit card. For example, a part of the utilization fee charged to each registered user is allocated to the cellular phone agency 1320, which is a dealing agency, for example, as incentives for utilization promoting activities. In addition, a part of the game utilization fee and/or the card transfer service charge can be passed on to the game planning company 1100. Furthermore, a specific user is extracted by using data on his or her game play status or card trading status, and campaign mails are transmitted to the specific user to promote utilization, and/or, for example, a special campaign is carried out to provide premium cards. At this time, the premium cards are provided from the game planning company 1100 to the cellular telephone agency 1320, which is the dealing agency, and directly provided from the cellular phone agency 1320 to the user 1410 and/or the user 1420.

Moreover, in this embodiment, a point called as a potlatch point is given every time a card is transferred through the virtual card dealing market 1020. The potlatch point is given to a transfer source user, and it is calculated on the basis of the number of cards relating to the transfer, rarity of the cards, attributes of the cards, levels of the cards and the like. The user can exchange the potlatch point with a special privilege such as a premium card or the like. As described above, the transfer of cards provides a merit to not only transfer destination users, but also transfer source users, and thus the transfer of cards is activated, so that it is expected to continually enhance the environment that the games are played among many users.

In addition, a right of acquiring a premium card may be given to the users 1410 and 1420 on the basis of the records of battles in the virtual card game space 1010. As described above, with respect to special privileges, such as premium cards, other than campaigns, they are also provided from the game planning company 1100 through the cellular phone agency 1320 to the user 1410 and/or the user 1420.

As described above, information on the game play statuses and information on card transfer statuses are accumulated in the service provider 1000. Accordingly, useful marketing information can be obtained by analyzing the accumulated information. The marketing information as described above is used by business 1200 for various kinds of consumers, and various kinds of advertisement activities are carried out for the user 1410 and 1420. Incidentally, it is possible to cover a part or all of the game utilization fees and the card transfer fees by advertisement charges to promote the utilization and transfer by users. The service provider 1000 can also gain information utilizing fees from the business 1200 for various kinds of consumers separately from the game utilizing fees, the card transfer fees of the users 1410 and 1420 and the like.

By providing the virtual card game space 1010 and the virtual card dealing market 1020, the users 1410 and 1420 can transfer cards in hand or fight battles through games with not only neighboring persons, but also faraway persons. Accordingly, users hardly lose their interests and continually play games. Accordingly, for the game planning company 1100 and the service provider 1000, instability of card selling due to rapid prevalence or reduction to obsolescence can be stabilized.

In addition, the information exchange is promoted between the users 1410 and 1420 by preparing not only the virtual card game space 1010 and the virtual card dealing market 1020, but also bulletin boards and/or chats, and thus not only the battle in the game and the card transfer, but also various ways to play may be developed beyond the intent of the game planning company 1100 and the like.

Furthermore, the users' interests can be maintained by changing and/or adding card design without changing the system in the service provider 1000, so that the running cost can be reduced. Furthermore, the rule of the game itself is comparatively simple as in the case of the traditional games, and thus there can be constructed such a system that any user can play at all times and is unwearied of the game.

Although it is described above, the card exchange and/or transfer enhances user-friendliness in thorough investigation of the card basic functions such as card collection and card battles, so that propagation and use of cards are promoted. In addition, records of card transfer on the system can be used for various kinds of marketing. In this embodiment, a rule for further promoting the transfer is introduced. In the battle using actual cards, some card falls into such a damage state as an injury state, a paralyzed state, a dead state, a cursed state or the like (hereinafter referred to as "damage state"), the damaged state concerned is released at the end time of the game, and the card concerned can be used from a normal state at the next game time. In this embodiment, a rule is applied so that when some cards fall into a damage state in the battle in the virtual card game space 1010, the damage state concerned is not released at the end of the battle. For example, the rule is set so that the damage state concerned is continued permanently or for a predetermined term, or continued until the battle is done at a predetermined number of times. However, in this embodiment, if the ownership of the card is transferred to another person, the damage state can be cleared, and the status can be initialized. Accordingly, if a user temporarily transfers such a card to his or her familiar friend to clear the damage state and then the friend transfers it to the user again, the user can immediately use the card, which is in an effective state, in the next game. In the following description, such an action that a card is temporarily transferred to a particular person and then it is returned from the same person to clear the status of the card is called as "status laundering".

Because the transfer is recorded on the system, by analyzing a transfer record, the service provider 1000 can know that the status laundering has been carried out, if bi-directional card transfer is carried out by the same persons within a predetermined period (for example, the same date). The status laundering is normally carried out between familiar friends or the like, and if the status laundering is detected, the relationship between them could be presumed. By using the information on the relationship concerned, various marketing activities can be carried out.

In addition, in this embodiment, it is assumed that a point called as a potlatch point is given to a transfer source user every card transfer as described above. The potlatch represents distribution of presents in a winter festival carried out as a symbol of richness and power among native Americans in the northwest district of North America. In that district, a person who gives more things with an open hand is conceded as a leader. In connection with this, the potlatch point is introduced, and as the transfer is more actively carried out, more potlatch points are given. When predetermined potlatch points or more are stocked, a premium card is presented from a registered dealing agency, for example. The obtained premium card can be used for games, exchange, transfer or the like as in the case of cards, which are normally purchased. A person having a higher potlatch point value is presumed as an opinion leader among users located around him or her, and it is used as useful information in the marketing. The way of calculating the potlatch point will be described in detail later. Furthermore, with respect to the potlatch point, two kinds of potlatch points are managed, one is a current value, which is reduced by exchange with a special privilege, another is an accumulated value, which is never reduced.

Figures 2, 3A, 3B, 3C:
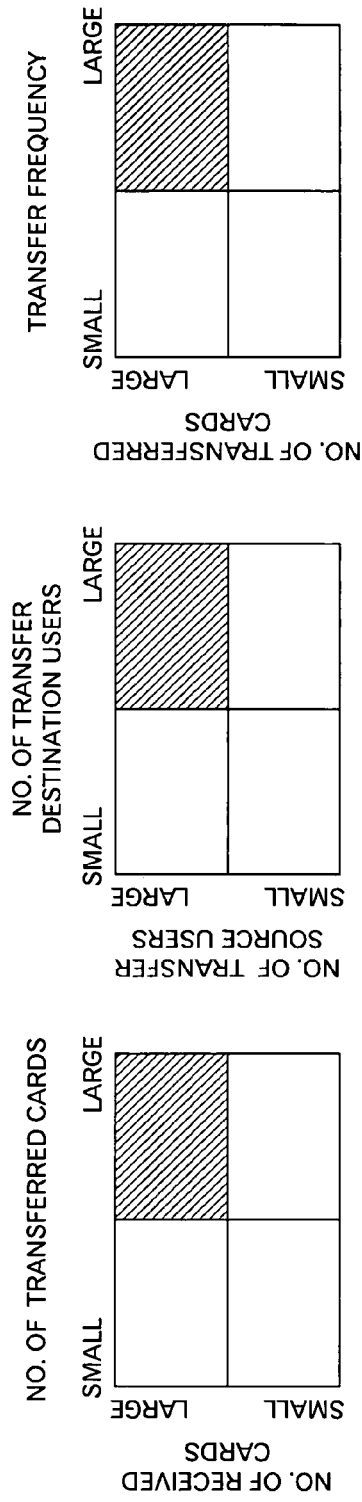
FIG. 2 is a diagram showing an outline of a process for marketing in the embodiment of the present invention.

Furthermore, as described above, a transfer record is recorded on the system. For example, when the transfer records are summarized every user, data as shown in FIG. 2 can be obtained. FIG. 2 shows the transfer records for a user A. The user A transfers cards of ID=04 and ID=05 to a user D on the same date. Furthermore, the user A transfers a card of ID=06 to a user E, and transfers cards of ID=07 and ID=08 to a user F on different dates. Furthermore, the user A transfers a card of ID=03 to a user C. On the other hand, the user A receives the cards of ID=01 and ID=02 from the user B, and also receives the card of ID=03 from the user C.

When computing statistics while following the above description, the number of transfer destination users is equal to 4, the number of transferred cards is equal to six, and the transfer is carried out at five times totally (the transfer to the same user on the same date is assumed as once). Moreover, the number of transfer source users is equal to two, the number of received cards is equal to three, and the receipt frequency is equal to three times. It is apparent that the transfer is more frequently carried out. In addition, the user A transfers and receives the same card to or from the user C on the same date, and accordingly, the status laundering is carried out, and thus it can be presumed that the user A and the user C are in familiar friendship.

Furthermore, as shown in FIG. 3(*a*), the number of received cards is set on the ordinate axis, the number of transferred cards is set on the abscissa axis, and predetermined numbers are set as threshold values to classify those numbers based on whether they are large numbers or smaller numbers than the threshold values to thereby make a matrix, whereby it is judged which block the user A belongs to, for example. Likewise, as shown in FIG. 3(*b*), the number of transfer source users is set on the ordinate axis, the number of transfer destination users is set on the abscissa axis and predetermined numbers are set as threshold values to classify those numbers based on whether they are larger numbers or smaller numbers than the threshold values to thereby make a matrix, whereby it is judged which block the user A belongs to, for example. As shown in FIG. 3(c), the number of transferred cards is set on the ordinate axis, the transfer frequency is set on the abscissa axis, and a predetermined number and frequency are set as threshold values to classify those numbers are larger numbers or smaller numbers than the threshold value to thereby make a matrix, whereby it is judged which block the user A belongs to, for example. By making such analysis, an active user who frequently carries out card transfer with many friends is extracted, and/or when the block to which the user belongs is varied every predetermined period is different, such a situation that the transfer had been actively carried out until one month before, however, the transfer has been hardly carried out in this month can be detected. In the latter case, it is possible to guide a user to a special campaign and work on the user to return to an active user.

Figures 4, 8:
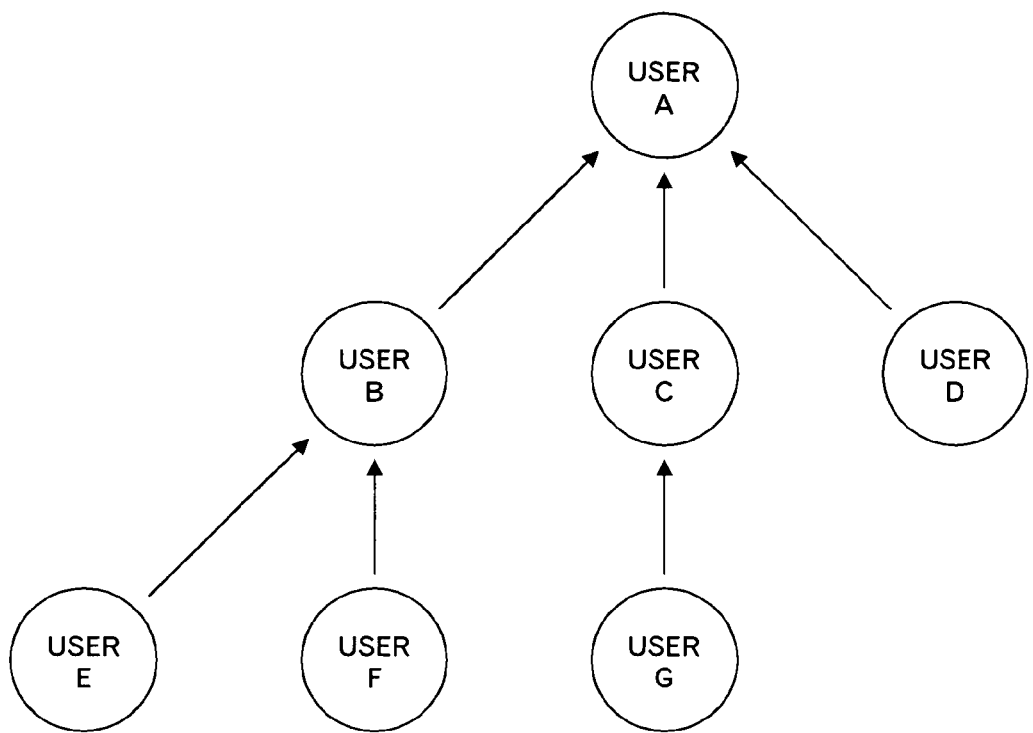
FIG. 4 is a diagram showing an outline of the process for the marketing in the embodiment of the present invention.
FIG. 8 is a diagram showing an example of a transfer management table in the embodiment of the present invention.

Moreover, when the transfer frequency or the number of transferred cards among users is analyzed and users who transfer more cards are traced, a tree as shown in FIG. 4 may be drawn. In the example shown in FIG. 4, with respect to the users G and C, the user C transfers more cards to the user G. With respect to the users C and A, the user A transfers more cards to the user C. With respect to the users D and A, the user A transfers more cards to the user D. Furthermore, with respect to the users E and B, the user B transfers more cards to the user E. With respect to the users B and F, the user B transfers more cards to the user F. With respect to the users A and B, the user A transfers more cards to the user B. Under such a state, the user A can be estimated as an opinion leader. For example, an opinion leader index is defined by a function of f (the potlatch point of the person concerned, opinion leader index of the transfer destination (a transfer destination to which more cards are transferred) (in the case of the lowermost layer, the potlatch point of the person concerned)) (for example, the potlatch point of the person concerned + the opinion leader index of the transfer destination) or the like. As described above, the opinion leader index is aggregated recursively, and a larger opinion leader index is allocated to a user who has a larger potlatch point and is located at the apex of a user group. Incidentally, in the calculation of the opinion leader index, when not the current value, but the accumulated value is used, a preferable result is obtained. If a user having a higher opinion leader index is supplied with a free sample or invited to a preview or an opinion research is carried out on the user concerned, it is expected that promotion to others is effectively performed by mouth-to-mouth advertising.

Figure 5:
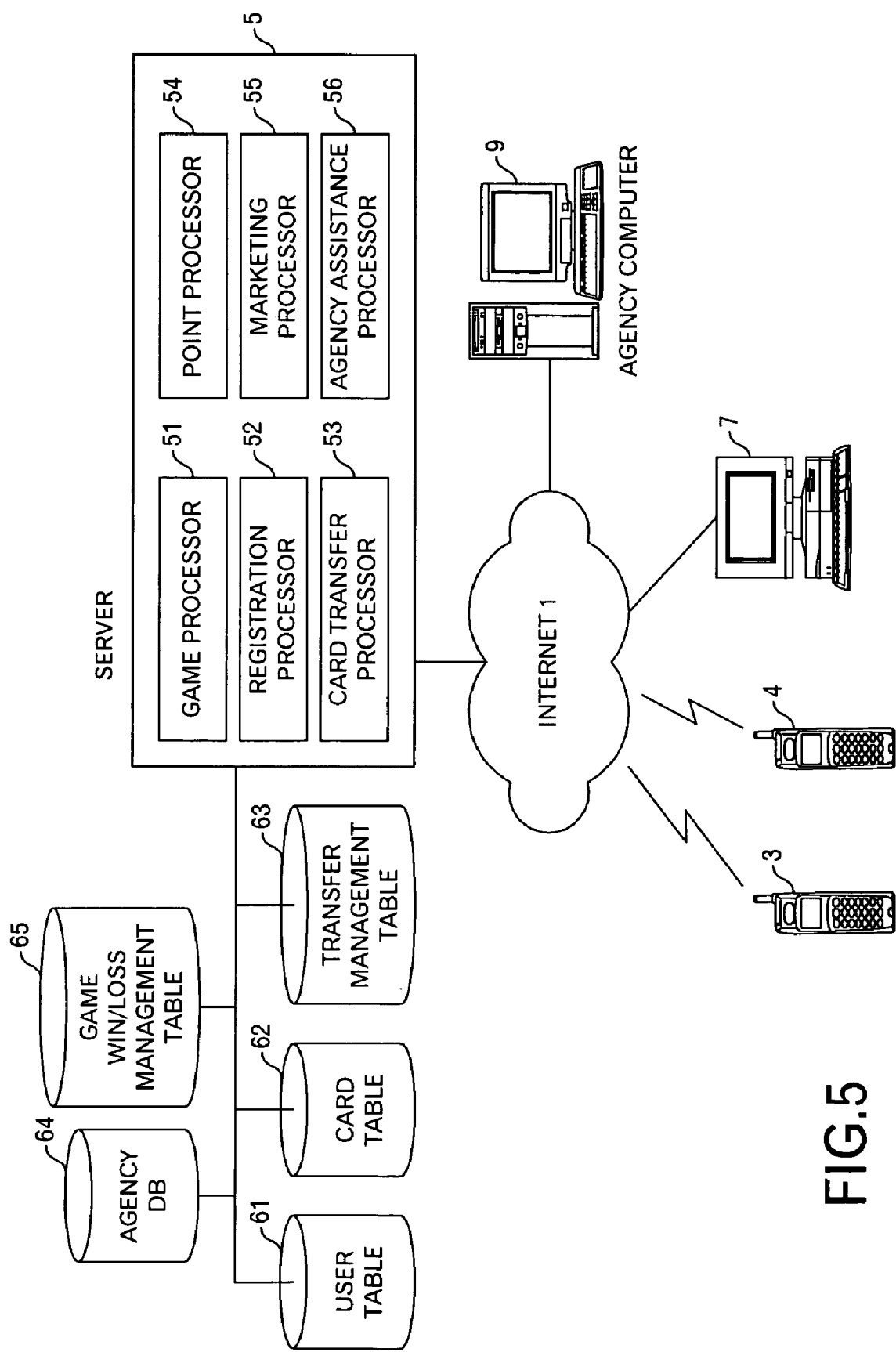
FIG. 5 is a diagram showing a system outline in the embodiment of the present invention.

For example, a computer system as shown in FIG. 5 is used to implement the business relating to the aforementioned embodiment of the present invention. To the Internet 1 that is a computer network are connected a server 5 for executing the main process in this embodiment, an agency computer 9, which is used in a cellular phone agency and is a personal computer or the like, a user terminal 7, which is used by a user and is a personal computer or the like, and cellular phones 3 and 4 used by users. If the user terminal 7 has a web browser and a mailer function, it may be a device such as a notebook type personal computer, and Personal Digital Assistant (PDA) as well as a desktop type personal computer. Furthermore, as not shown, not only one user terminal 7, but also plural user terminals 7 are connected to the Internet 1. The cellular phones 3 and 4 have a Web browser and a mailer function, and more cellular phones are connected to the network 1. The agency computer 9 has a web browser and a mailer function, and at least one agency computer is provided for each cellular phone agency. The agency computer 9 can be connected to a cellular phone, and information of subscriber IDs of the cellular phones can be read out by the agency computer 9, if occasion demands.

The server 5 contains a game processor 51 for carrying out a process for network card games, a registration processor 52 for carrying out a process for registration of users themselves and registration of cards by users, a card transfer processor 53 for carrying out a process for simple card transfer and card auctions, a point processor 54 for carrying out a process associated with the potlatch point, a marketing processor 55 for carrying out information process needed for promotion and the like on the basis of the transfer records and the game play conditions described with reference to FIGS. 2 to 4, and an agency assistance processor 56 for carrying out a process of assisting the business of the cellular phone agency. Incidentally, the marketing processor 55 carries out the process of analyzing the transfer records registered in a card transfer management table 63 to detect execution of status laundering, and to also specify interested parties. The detailed process contents will be described in the processing flow.

Moreover, the server 5 manages a user table 61 for managing information of users, a card table 62 for managing cards used in the network card games, a transfer management table 63 for managing the card transfer executed through the card transfer processor 53 in the server 5, an agency DB 64 for managing information associated with the cellular phone agencies, and a game win/loss management table 65 for managing the win/loss of games carried out by users.

FIG. 6 shows an example of the user table 61. In the example of FIG. 6 are provided a column 601 of user IDs, a column 602 of user names, a column 603 of subscriber IDs of cellular phones, a column 605 of telephone numbers, a column 606 of mail addresses, a column 607 of registered agency IDs, a column 608 of game utilizing fees containing card transfer service charges, a column 609 of current value of the potlatch point, a column 610 of accumulated values of the potlatch point, and a column 611 of possessed card IDs. In addition, passwords, users' addresses and other personal information may be registered. When a user plays a game by using a cellular phone, it may be made possible to play a game and/or transfer a card without authentication, because the cellular phone can be specified by its subscriber ID. In this embodiment, it is required to register one cellular phone agency for receiving and transferring actual cards, and a cellular phone agency selected by a user is registered in the column 607 of the registered agency IDs. As described above, it is better in many cases to use the accumulated value of the potlatch point in the marketing or the like, and accordingly the accumulated value is managed separately from the current value, which is reduced by making an exchange with a premium card or the like. Incidentally, as described below, the attributes of the potlatch point may be managed. As not described here, there is a case where a possessed card list is separately provided every user, and cards possessed by the user are managed by the possessed card list.

FIG. 7 shows an example of the card table 62. In the example of FIG. 7, it contains a column 621 of card IDs, a column 622 of type IDs, a column 623 of card names, a column 624 of distribution statuses, a column 625 of card rarities representing rarity of cards, a column 626 of card levels representing experience values in battle, a column 627 of possessing user IDs, a column 628 of statuses in a game when the card concerned is used in the game, a column 629 of deck installation flag representing whether the card concerned is used while the card concerned is installed on the deck when the owner of the card concerned currently plays the game, and a column 630 of card attributes. The type ID is an ID representing a character card, an event card or other type, for example. The distribution status contains a state in which a user holds it, a state in which a cellular phone agency holds it, a state in which a game planning company holds it, a non-registered state under which it is distributed, however, the possessing user ID has not yet been registered for it, and the like. The card rarity represents rarity, and when only one card exists every 1000 other cards, the card rarity of the card concerned is set to 1000, which is reciprocal. The status in a game contains a normal state, a damage state, which is imposed in battle, such as a dead state, a cursed state, a paralyzed state and the like as shown in FIG. 7. The attributes contain not only attributes preset to cards such as fire, water, earth, wind, and the like, but also a battle power value, a protecting power value, a special (magic) power value and the like (not shown).

FIG. 8 shows an example of the transfer management table 63. In the example of FIG. 8, it contains a column 635 of transfer source users, a column 636 of transfer destination users, a column 637 of card IDs, a column 638 of transfer dates and times, a column 639 of transfer service charges, and a column 640 of persons to be charged for the transfer service charges. With respect to the transfer service charge, it is not necessarily provided if it is fixed to the transfer source user or the transfer destination user at all times. However, as described below, the transfer source user is charged in some cases and the transfer destination user is charged in the other cases. Furthermore, when a receipt acceptance request mail with an advertisement is used, an advertiser is charged with the card transfer service charge in some cases. Accordingly, in this embodiment, a person who bears a card transfer service charge is registered.

An agency DB 64 contains an agency table provided every cellular phone agency, an agency owner table for owners of affiliated cellular phone agencies in a case where the cellular phone agencies are affiliated with one another, and a registered user table provided so as to correspond to each agency table. FIG. 9 shows an example of the agency table. In the example of FIG. 9, it contains a column 645 of agency IDs, a column 646 of owner IDs to store owner IDs when an owner exists for each agency, a column 647 of registered user table pointers, a column 648 of a total utilizing fees of registered users per month, for example, and a column 649 of gained incentives. In this embodiment, a part of the total utilizing amount of the game utilizing fees, the card transfer service charges and the like, which were spent by the registered users for a month, for example, is paid to the cellular phone agency as an incentive.

FIG. 10 shows an example of the registered user table of a certain cellular phone agency, which is indicated by the registered user table pointer registered in the agency table. In the example of FIG. 10, it contains a column 650 of user IDs, a column 651 of user names, a column 652 of utilizing fees of the game utilizing fee, the card transfer service charge and the like per month, a column 653 of holding flags representing whether there is any card being held by the cellular phone agency, and a column 654 of card IDs of cards being held to store the card ID of a card when there is any card being held by the cellular phone agency. The cellular phone agency can confirm from the registered user table, which user actively uses the network card game. In addiction, because the cellular phone agency is a shop that is a base point for actual card dealings to directly transfer cards and the like to users, it holds information on the cards being held, and when the user comes to the shop, the aforementioned information can be referred. In the registered user table is also registered information on the total number of users who register the cellular phone agency concerned as a dealing agency, the total utilizing fee of all the registered users per month, for example, and the like.

FIG. 11 shows an example of the agency owner table. In the example of FIG. 11, it contains a column 661 of owner IDs, a column 662 of affiliated agency IDs, and a column 663 of total incentives to store the total incentives obtained by the affiliated agency.

FIG. 12 shows an example of the game win/loss management table 65. In the example of FIG. 12, it contains a column 665 of opponents A to store a user ID of an opponent A, a column 666 of opponents B to store a user ID of an opponent B, a column 667 of dates of battle, and a column 668 of winners. In this embodiment, one-to-one battler is assumed. However, generally, more persons may be allowed to participate in a game.

Although it is not shown, a log DB for obtained potlatch points or the like may be prepared.

Figure 13:
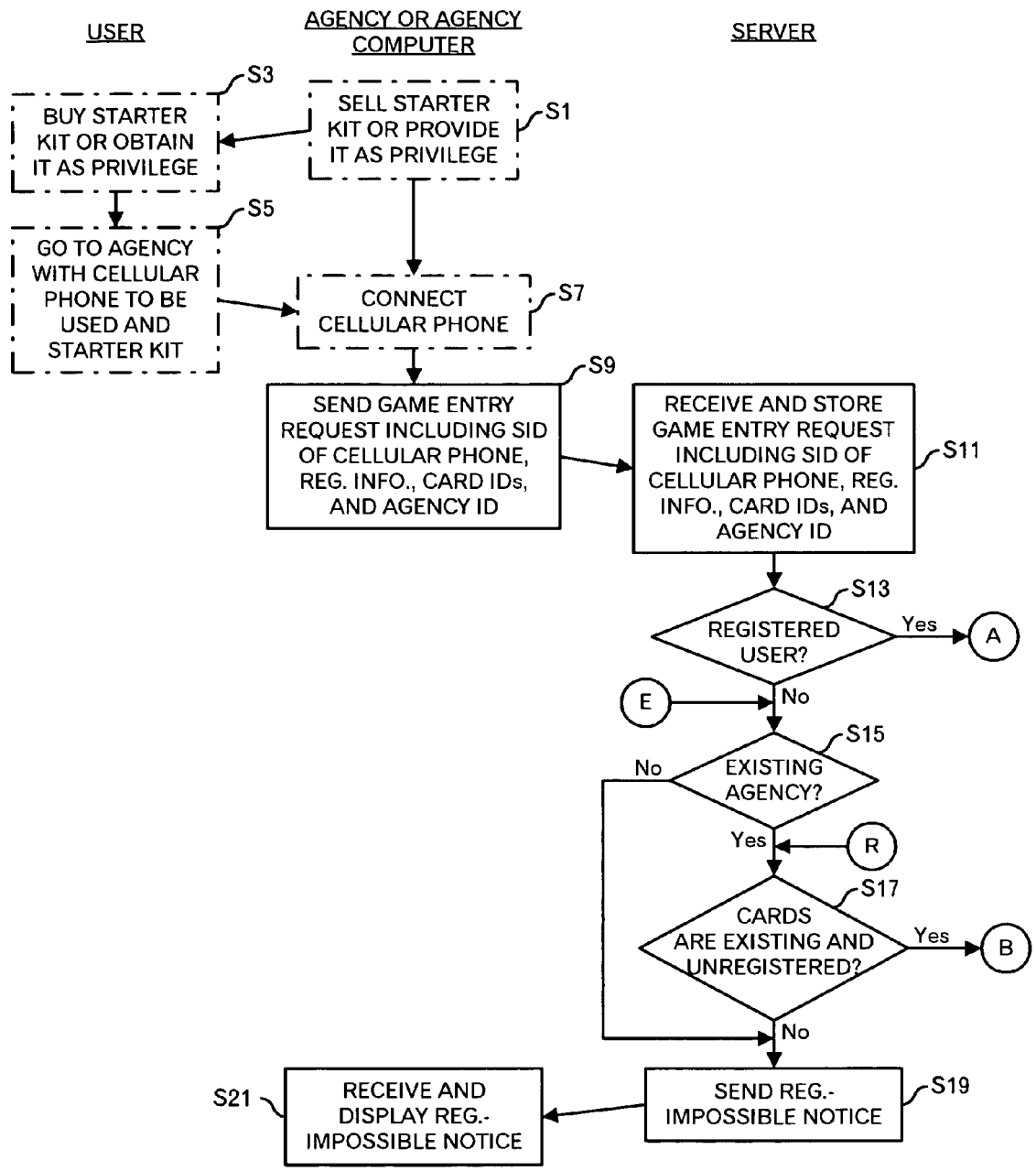
FIG. 13 is a diagram showing a processing flow for game participation registration in the embodiment of the present invention.

In the following, the process carried out by the system shown in FIG. 5 will be described with reference to FIGS. 13 to 29. Incidentally, the operation of the user or the cellular phone agency itself will be described by using blocks of dashed lines, and the process of the user terminal (containing the cellular phone 3, the cellular phone 4, the user terminal 7), the agency computer 9 and the server 5 will be described by using blocks of solid lines. FIG. 13 shows a process when a user goes to a cellular phone agency selected as a dealing agency while carrying a cellular phone 3, and carries out user registration (also called as game entry registration). First, the cellular phone agency or the store sells cards as a starter kit to the user, or supplies cards as some privilege, so that a deck is fabricated (step S1). For example, the cards may be supplied as free gifts for purchase of a cellular phone or for coming to the shop. The user purchases the starter kit from the cellular phone agency or the store or obtains it as some privilege (step S3). When the user is a non-registered user and desires to use a network card game, the user comes to the cellular phone agency selected as a dealing agency while carrying the cards contained in the starter kit (may be only the card IDs) and the cellular phone 3 (step S5). Upon receiving an application of requesting user registration from the user, the cellular phone agency connects the cellular phone 3 to be used, to the agency computer 9 (step S7). By operating the agency computer 9, a game entry request containing the subscriber ID of the cellular phone 3 (hereinafter referred to as "SID"), the user registration information (user name, telephone number, mail address and other personal information), the card IDs of cards to be registered, and the agency ID of the dealing agency is transmitted to the server 5 by a Web browser, for example (step S9). With respect to SID, it may be read from the cellular phone 3 connected to the agency computer 9, or there may be adopted such a mechanism that SID is automatically transmitted by connecting to the server 5 through the cellular phone 3. The registration processor 52 of the server 5 receives from the agency computer 9, the game entry request containing SID of the cellular phone 3, the user registration information, the card ID and the agency ID, and temporarily stores it in a storage device (step S11). Then, it searches the user table 61 by using SID, for example, and checks whether the user has already been registered (step S13).

Figure 14:
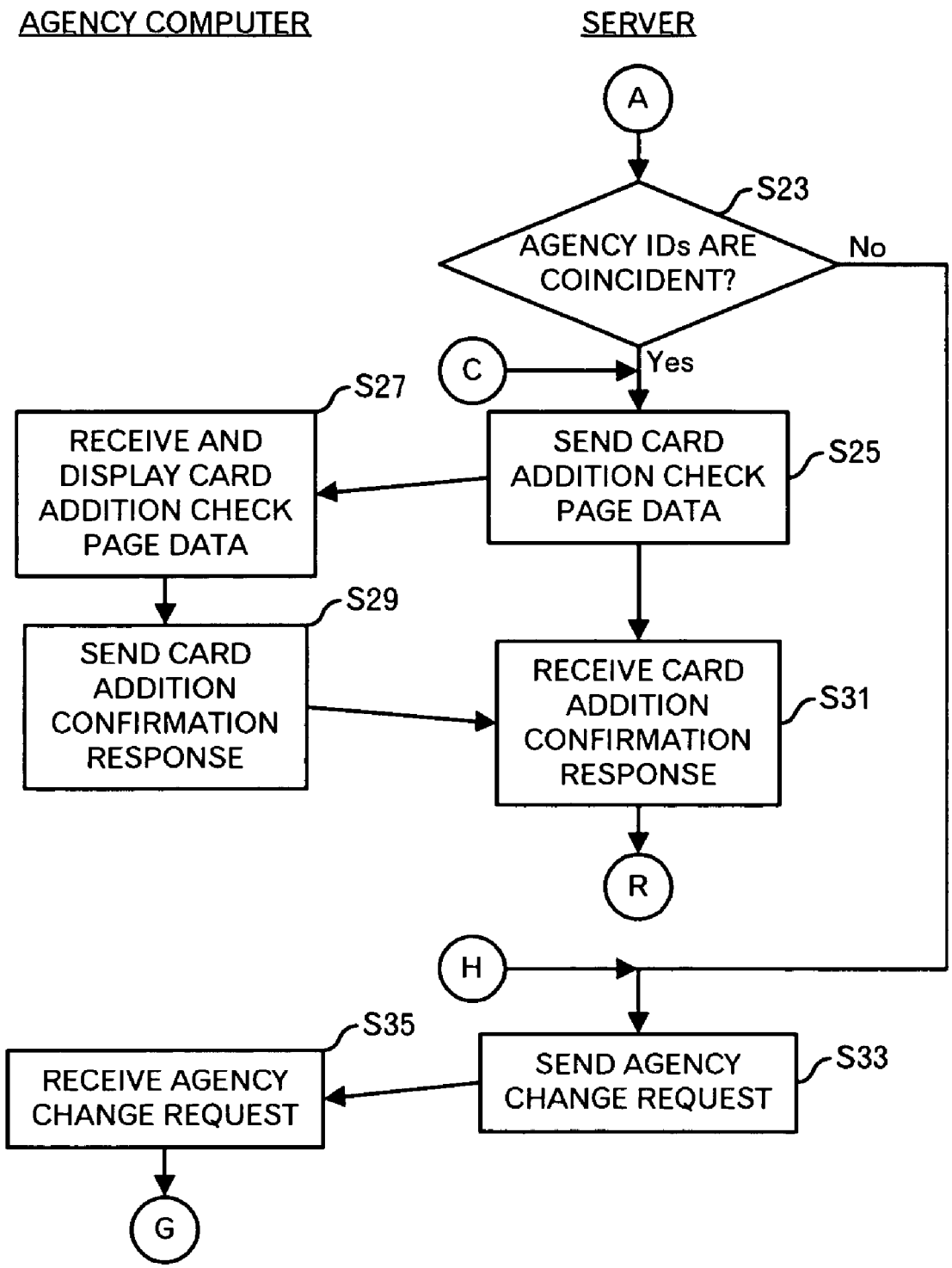
FIG. 14 is a diagram showing a processing flow for the game participation registration in the embodiment of the present invention.

If it is judged that the user has been already registered, the process goes to a process in FIG. 14 through a terminal A. On the other hand, if the user is judged as a non-registered user, it searches the agency table (FIG. 9) in the agency DB 64 on the basis of the agency ID, and checks whether the agency is an existing cellular phone agency or not (step S15). If it is judged that an agency ID, which does not exist, is used, the process goes to step S19. On the other hand, if it is judged as an existing cellular phone agency, it searches the card table 62 by using each card ID, and judges whether the card to be registered is a non-registered existing card for which the user ID has not yet been registered in the column 627 of possessing user ID (step S17). If the card is judged as a non-registered card, the process goes to a process of FIG. 15 through a terminal B. On the other hand, when the cards to be registered contain a non-existing card or a card for which the user ID of another user has been already registered as an owner, it generates a registration-impossible notice containing the reason why the registration is impossible (for example, Web page data (for example, a file written by HTML (Hyper Text Markup Language), compact HTML or the like, a necessary image file and the like), and transmits the notice to the agency computer 9 (step S19). For example, the notice contains a message representing the reason why the registration is impossible such as "a non-existing agent is designated" or "you are about to register a card for which another user has already registered". When receiving a registration-impossible notice from the server 5, the agency computer 9 displays it on a display device (step S21). The cellular phone agency and the user can check the contents of the game entry request and retry to input the data, whereby they can transmit a game entry request again.

A process after the terminal A (the process when it is judged that the user has been already registered) will be described with reference to FIG. 14. The registration processor 52 of the server 5 compares the agency ID contained in the game entry request with the agency ID registered in the column 607 of registered agency IDs in the user table 61 so as to correspond to the received SID (step S23). If both the agency IDs are coincident with each other, the game entry request is mixed up with a card addition request, and accordingly, it transmits card addition check page data for inquiring about whether card addition should be carried out (step S25). The agency computer 9 receives the card addition check page data from the server 5, and displays it on the display device by the Web browser (step S27). If a staff member of the cellular phone agency or a user cannot accept the card addition check message displayed on the display device when he or she looks at the card addition check message, he or she makes an inquiry to the administrator of the server 5 by a telephone or the like, for example. If the staff member or the user can accept the message, he or she operates the agency computer 9 to click a confirmation button or the like, thereby transmitting a card addition confirmation response to the server 5 (step S29). Upon receiving the card addition confirmation response from the agency computer 9 (step S31), the process shifts to the step S17 in FIG. 13 through a terminal R.

On the other hand, if it is judged at the step 23 that the agency ID contained in the game entry request is not coincident with the agency ID registered in the column 607 of registered agency IDs in the user table 61 so as to correspond to the received SID, it is required to alter the agency, and therefore the registration processor 52 generates agency change request page data and transmits it to the agency computer 9 (step S33). The agency change request page contains a message requesting for agency change, and also a message requesting to carry out card registration additional process after the agency change proceeding. Upon receiving the agency change request page data from the server 5, the agency computer 9 displays it on the display device by the Web browser (step S35), and then the process shifts to a process in FIG. 20 through a terminal G.

Figure 15:
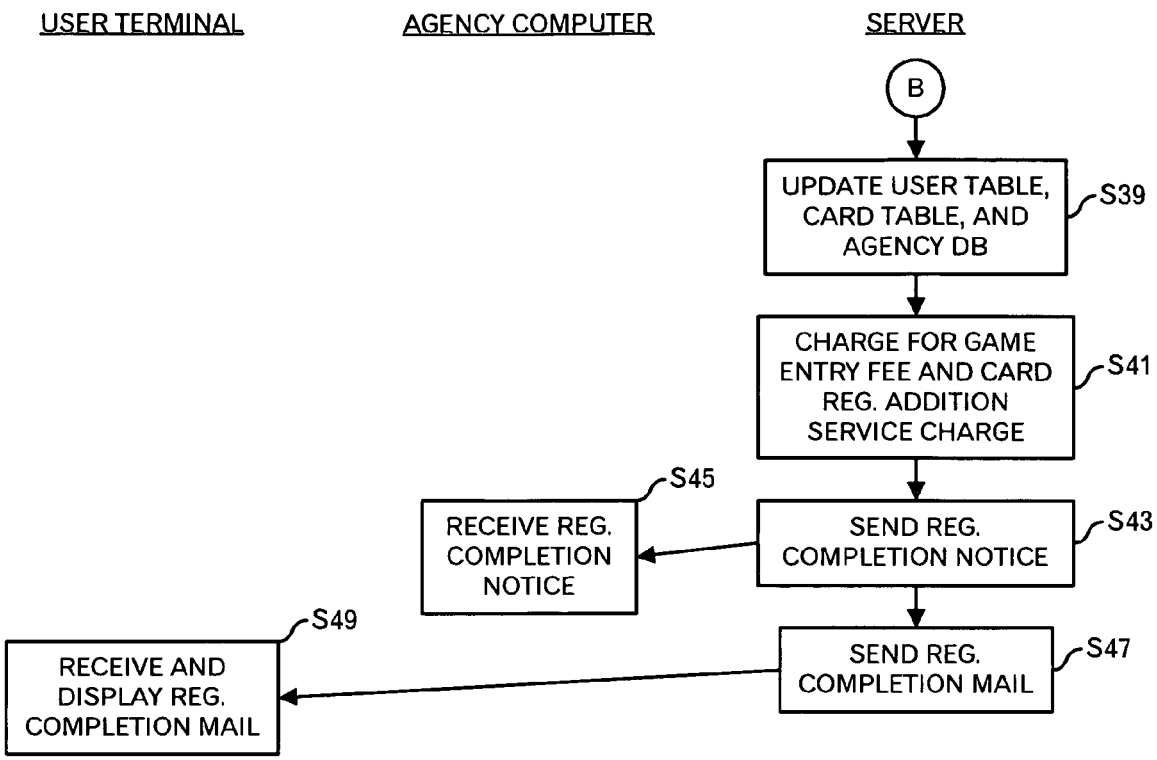
FIG. 15 is a diagram showing a processing flow for the game participation registration in the embodiment of the present invention.

Next, a process after the terminal B (a process when the cards are judged as existing and non-registered cards) will be described with reference to FIG. 15. The registration processor 52 of the server 5 judges that the game entry request is proper and thus registers the issued user ID, the user name, the subscriber ID, the telephone number, the mail address, the agency ID, the possessed card ID, and the like in the user table 61. Also in the card table 62, it registers the issued user ID in the column 627 of possessing user IDs so as to correspond to the card ID contained in the game entry request, and also registers "user holding" in the column 624 of distribution statuses. It registers the currently issued user ID into the registered user table corresponding to the agency ID contained in the game entry request in the agency DB 64 (step S39). Moreover, it carries out a process of charging for the game entry fee (admission fee) and the card registration addition service charge (step S41). Although the charging is the same as the conventional art, and it is not described in detail, in the user table 61, it registers the amount of money calculated by adding the game entry fee and the card registration service charge in the column 608 of game utilizing fees so as to correspond to the user ID issued this time. Moreover, in the registered user table (FIG. 10) corresponding to the agency ID contained in the game entry request in the agency DB 64, it increases the value of the game utilizing fee for the transmission source user of the game entry request by the amount of only the card registration addition service charge, for example, and then stores it in the column 652 of game utilizing fees. Moreover, in the agency table (FIG. 9), it increases the value of the total utilizing amount of registered users for the received agency ID by the amount of the card registration addition service charge, for example, and then stores it in the column 648 of total utilizing amount of registered users.

The registration processor 52 of the server 5 generates a registration completion notice containing the user ID and the like, and transmits it to the agency computer 9 (step S43). The agency computer 9 receives the registration completion notice containing the user ID and the like from the server 5, and displays it on the display device by the Web browser or the like (step S45) Accordingly, the staff member of the cellular phone agency or the user can recognize the registration completion, and obtain the user ID and the like, which are afterwards used for card transfer and the like. For confirmation, the registration processor 52 of the server 5 transmits a registration completion mail containing information such as the user ID to the user (step S47). The user receives the registration completion mail containing the user ID and the like from the server 5 by using the user terminal such as the cellular phone 3, and causes the user terminal to display it on the display device (step S49). The user can check the registered contents again by the registration completion mail. When the number of registered cards reaches the lower limit number to carry out a battle, the user is allowed to participate in a network card game.

Figure 16:
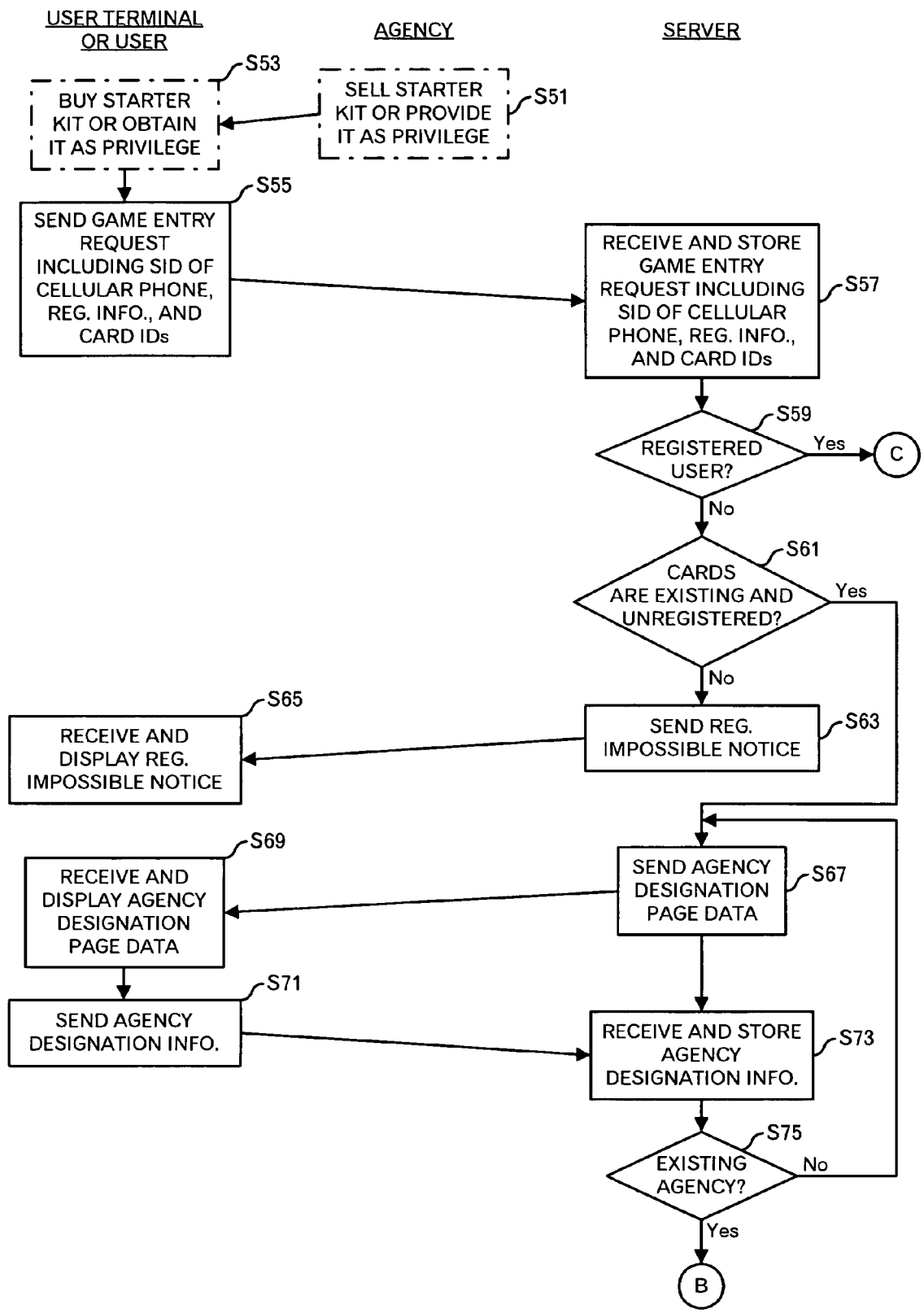
FIG. 16 is a diagram showing a processing flow for the game participation registration in the embodiment of the present invention.

Although in the above case, the user comes to the cellular phone agency and carries out the game entry registration, a process when the user carries out the game entry registration without coming to the cellular phone agency will be described with reference to FIG. 16. First, a cellular phone agency or a store sells cards as a starter kit to a user so that the user can fabricate a deck, or supplies these cards as some privilege (step S51). For example, these cards may be supplied as a free gift for purchase of a cellular phone or as a free gift for coming to the store. The user purchases the starter kit from the cellular phone agency or the store or obtains the starter kit as some privilege (step S53) The user operates the cellular phone 3 or the like to access the game entry registration page of the server 5 without going to a selected dealing agency. Then, on the game entry registration page, he or she inputs registration information of the user (user name, telephone number, mail address and other personal information) and the card IDs of cards to be registered. Next, when the user instructs to transmit the registration information, the cellular phone 3 transmits a game entry request containing SID of the cellular phone, the user's registration information and the card IDs of the cards to be registered to the server 5 (step S55). The registration processor 52 of the server 5 receives from the cellular phone 3, the game entry request containing SID of the cellular phone, the user's registration information and the card IDs of the cards to be registered and temporarily stores it into the storage device (step S57).

The registration processor 52 of the server 5 searches the user table 61 by using SID, and checks whether the user concerned has been already registered or not (step S59). If it is judged that the user is a registered user, the registration processor 52 shifts to the step S25 of FIG. 14 through the terminal C. On the other hand, if it is judged that the user is a non-registered user, it searches the card table 62 on the basis of each card ID, and judges whether each card to be registered exists and is a non-registered card for which the user ID has not yet been registered in the column 627 of possessing user ID (step S61). If the cards to be registered contain a card, which does not exist or a card for which the user ID of another user has been registered as an owner, it generates registration impossible notification page data containing the reason why the registration is impossible, and transmits the page data to the cellular phone 3 (step S63). The page contains a message representing the reason why the registration is impossible such as "you are about to register a card for which another user has been already registered", for example. When receiving the registration impossible notification page data from the server 5, the cellular phone 3 displays the data on the display device (step S65). The user can transmit the game entry request again by checking the contents of the game entry request and re-inputting data.

On the other hand, if it is judged that cards to be registered exist and are non-registered cards, the registration processor 52 transmits page data to designate an agency to the cellular phone 3 (step S67). The page to designate the agency may be designed to contain a list of agencies in a user residence district. When receiving the page data to designate the agency from the server 5, the cellular phone 3 displays the data on the display device by the Web browser or the like (step S69). By selecting a cellular phone agency convenient for the user and clicking a transmission button, he or she causes the user terminal to transmit agency selection information to the server 5 (step S71). When receiving the agency selection information from the cellular phone 3, the registration processor 52 of the server 5 temporarily stores it into the storage device (step S73), and searches the agency table (FIG. 9) in the agency DB 64 on the basis of the agency ID of the selected agency to judge whether the selected agency exists (step S75). If an agency, which does not exist, is selected for some reason, the registration processor 52 returns to the step S67 to request the user to select another agency again. On the other hand, it is confirmed that the agency exists, the process shifts to the process of FIG. 15 through the terminal B. In this case, the process is carried out by assuming the agency computer 9 as the cellular phone 3.

As described above, it is possible to carry out the game entry registration through no cellular phone agency, and it is the same to select and register one cellular phone agency.

Figure 18:
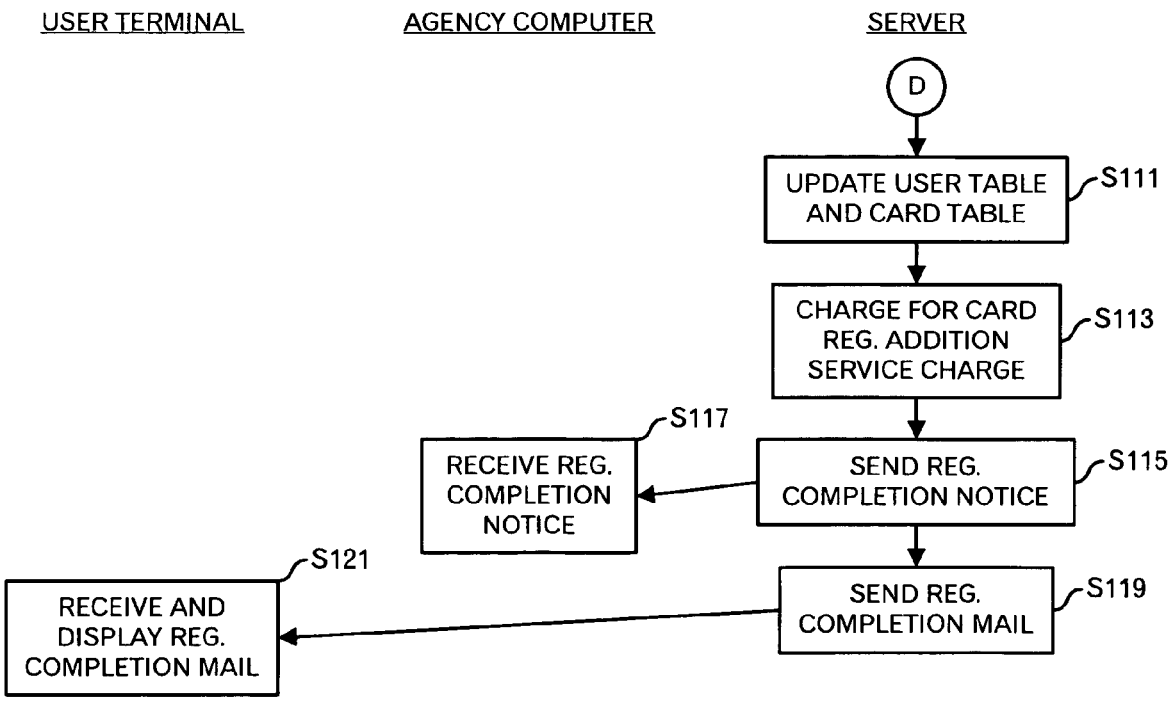
FIG. 18 is a diagram showing a processing flow of adding card registration in the embodiment of the present invention.
Figure 17:
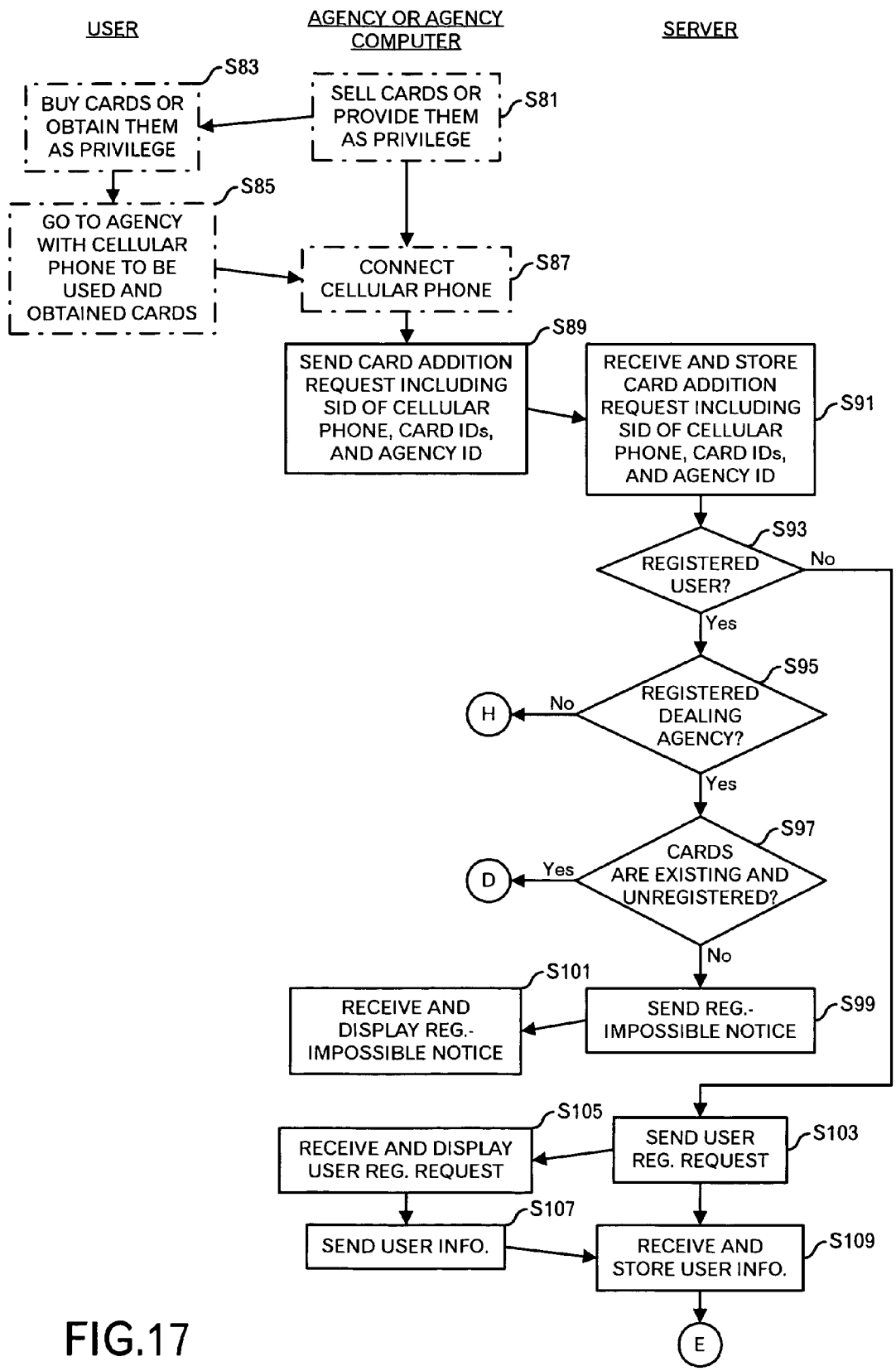
FIG. 17 is a diagram showing a processing flow of adding card registration in the embodiment of the present invention.
Figure 19:
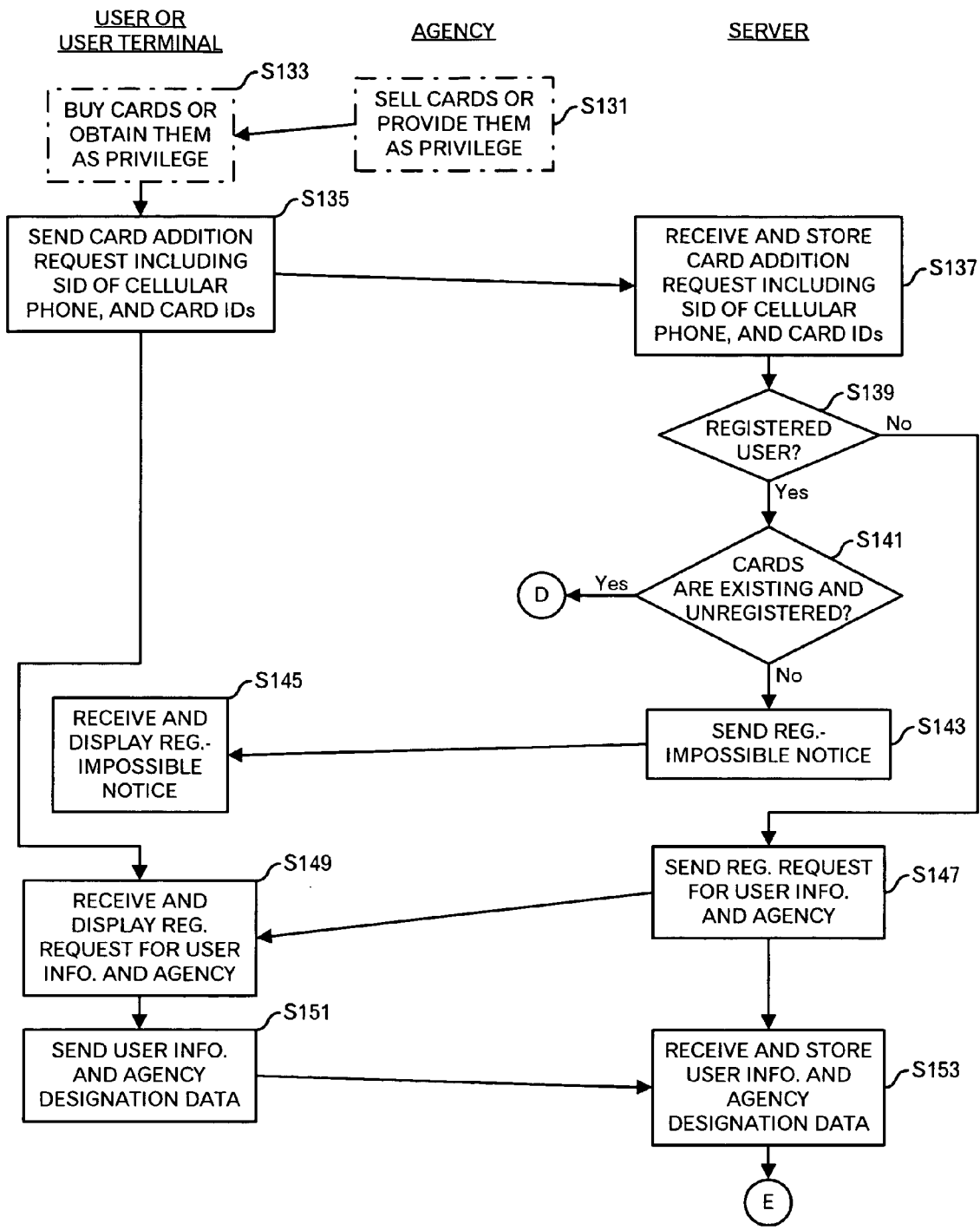
FIG. 19 is a diagram showing a processing flow for adding card registration in the embodiment of the present invention.

Next, a process when a new card is obtained after the game entry registration is carried out and the additional registration is carried out to the server 5 will be described with reference to FIGS. 17 to 19. FIG. 17 shows a process when the user goes to a registered dealing agency while carrying the cellular phone 3 and carries out the additional registration of the cards. First, a cellular phone agency or a store sells packaged cards to the user or supplies the packaged cards to the user as some privilege (step S81). For example, the packaged cards may be supplied to the user as a free gift for purchase of a cellular phone or as a free gift for coming to the store. The user purchases cards from the cellular phone agency or the store or obtains cards as some privilege (step S83). The user comes to a cellular phone agency registered as a dealing agency while carrying the cards (may be only card IDs) thus obtained and the cellular phone 3 (step S85). When receiving an application for the additional registration of the cards from the user, the cellular phone agency connects the cellular phone 3 to be used to the agency computer 9 (step S87), and operates the agency computer 9 to transmits a card addition request containing SID of the cellular phone 3, the card IDs of cards to be registered and the agency ID of a dealing agency to the server 5 through the Web browser (step S89). SID may be read from the cellular phone 3 being connected to the agency computer 9 or there may be adopted such a mechanism that the cellular phone 3 is connected to the server 5 to automatically transmit SID. The registration processor 52 of the server 5 receives the card addition request containing SID of the cellular phone 3, the card IDs and the agency ID from the agency computer 9, and temporarily stores it into the storage device (step S91). Then, it searches the user table 61 by using SID to check whether the user has been already registered (step S93).

If it is judged that the user is a registered user, it judges whether the agency ID contained in the card addition request is coincident with ID of the registered dealing agent of the user concerned, which is registered in the column 607 of registered agency IDs in the user table 61 so as to correspond to the received SID (step S95). If it is judged that both the IDs are not coincident with each other, the process shifts to the step S33 of FIG. 14 through a terminal H, and requests the user to carry out the agency change process. On the other hand, if it is judged that both the IDs are coincident with each other, it judges whether cards to be registered exist and are non-registered cards for which the user ID has not yet been registered in the column 627 of possessing user IDs in the card table 62 (step S97). If it is judged that the cards to be registered are non-registered cards, the process shifts to a process of FIG. 18 through a terminal D. On the other hand, if cards to be registered contain a card which does not exist or for which the user ID of another user has been already registered as an owner, it generates registration impossible notification page data containing the reason why the registration is impossible, and transmits the page data to the agency computer 9 (step S99). For example, the page data contains a message representing the reason why the registration is impossible such as "you are about to register a card for which another user has been already registered" or the like. When receiving the registration impossibility notification page data from the server 5, the agency computer 9 displays the data on the display device (step S101). The cellular phone agency or the user can transmits the card addition request again by checking the contents of the card addition request, and re-inputting the card ID.

On the other hand, if it is judged at step S93 that the card addition request is made by a non-registered user who has not yet been registered in the user table 61, it can be judged that the card addition request is mixed up with the game entry request, and thus the registration processor 52 of the server 5 transmits the user registration request page data containing input columns of user information and the like to the agency computer 9 (step S103) The agency computer 9 receives the user registration request page data from the server 5 and displays the data on the display device by the Web browser (step S105). The user or the staff member of the cellular phone agency looks at the display device, and when the user registration is newly carried out, he or she fills the user name, the mail address, the telephone number, payment information and the like into the input columns of the user information and then clicks the transmission button to instruct transmission of the user information. In response to the transmission instruction by the user, the agency computer 9 transmits the input user information to the server 5 (step S107). When receiving the user information from the agency computer 9, the registration processor 52 of the server 5 temporarily stores the user information into the storage device (step S109), and then the process shifts to the step S15 of FIG. 13 through a terminal E.

Next, a process after the terminal D (a process when it is judged that the cards are existing and non-registered cards) will be described with reference to FIG. 18. The registration processor 52 of the server 5 judges that the card addition request is proper, and registers the received card IDs into the column 611 of possessed card IDs corresponding to the received SID in the user table 61. In addition, in the card table 62, it registers the user ID specified by SID in the column 627 of possessing user IDs on the line of the card ID contained in the card addition request, and also registers "user holding" in the column 624 of distribution statuses (step S111). Moreover, a process of charging for the card registration addition service charge is carried out (step s113). It registers the amount of money to which the current card registration addition service charge is added, in the column 608 of game utilizing fees so as to correspond to the user ID specified on the basis of SID in the user table 61. Moreover, in the registered user table corresponding to the agency ID specified based on the SID in the agency DB 64, it increases the amount of money by only the amount of the card registration addition service charge, and stores it in the column 652 of game utilizing fees so as to correspond to the user ID specified based on the SID.

The registration processor 52 of the server 5 generates a registration completion notice, and transmits it to the agency computer 9 (step S115). The agency computer 9 receives the registration completion notice from the server 5, and displays it on the display device (step S117). Accordingly, the staff member of the cellular phone agency or the user can recognize that the additional registration of the cards completes. For confirmation, the registration processor 52 of the server 5 transmits a registration completion mail containing the additionally registered card IDs and the like to the user (step S119). The user receives the registration completion mail containing the information on the additionally registered card IDs and the like from the server 5 by using the user terminal such as the cellular phone 3 or the like, and causes the user terminal to display it on the display device (step S121). The user can check the registered contents again from the additional registration completion mail for the cards.

In the above case, the user comes to the cellular phone agency to carry out the additional registration of the cards. Next, a process when the user carries out the additional registration of the cards without coming to the cellular phone agency will be described with reference to FIG. 19. First, a cellular phone agency or a store sells packaged cards to a user or supplies packaged cards to a user as some privilege (step S131). For example, packages cards may be supplied to a user as a free gift for purchase of a cellular phone or as a free gift for coming to the store. The user purchases or obtains as some privilege, cards from the cellular phone agency or the store (step S133). The user does not go to the registered dealing agency, and operates the cellular phone 3 or the like to access additional registration page of the cards in the server 5. In the additional registration page of the cards, the user inputs the card IDs of the cards to be registered. Then, when the user instructs the transmission, the cellular phone 3 transmits a card addition request containing SID of the cellular phone and the card IDs of the cards to be registered to the server 5 (step S135). The registration processor 52 of the server 5 receives the card addition request containing SID of the cellular phone and the card IDs of the cards to be registered from the cellular phone 3, and temporarily stores it into the storage device (step S137).

The registration processor 52 of the server 5 searches the user table 61 by using SID, and checks whether the user has been already registered or not (step S139). If the user is judged as a registered user, it searches the card table 62 on the basis of each card ID to judge whether each card to be registered exists and is a non-registered card for which no user ID has been registered in the column 627 of possessing user IDs (step S141). If the cards to be registered contain a non-existing card or a card for which the user ID of another user has been already registered as an owner, it generates registration impossible notification page data containing the reason why the registration is impossible, and transmits the page data to the cellular phone 3 (step S143). For example, it contains a message representing the reason why the registration is impossible such as "you are about to register a card for which another user has been already registered". When receiving the registration impossible notification page data from the server 5, the cellular phone 3 displays the data on the display device (step S145). The user can transmit the card addition request again by checking the contents of the card addition request, and re-inputting card IDs. On the other hand, if the cards to be registered exist and are non-registered cards, the process shifts to the process of FIG. 18 through the terminal D. In this case, the process is carried out by assuming the agency computer 9 as the cellular phone 3.

On the other hand, if it is judged at the step S139 that the user is a non-registered user, the registration processor 52 of the server 5 transmits registration request page data for the user information and the agency to the cellular phone 3 (step S147). The registration request page for the user information and the agency may contain input columns of the user information and a list of selectable agencies. When receiving the registration request page data for the user information and the agency from the server 5, the cellular phone 3 displays the data on the display device (step S149). The user inputs necessary items into the input columns of the user information, selects one cellular phone agency convenient for the user and clocks the transmission button. Then, the cellular phone 3 transmits the user information and the agency designation data to the server 5 (step S151). When receiving the user information and the agency designation data from the cellular phone 3, the registration processor 52 of the server 5 temporarily stores it into the storage device (step S153). Then the process shifts to the step S15 in FIG. 13 through the terminal E. Incidentally, when the process shifts to the process in FIG. 15, the process is carried out by assuming the agency computer 9 as the cellular phone 3. As described above, the additional registration of the cards can be performed without any cellular phone agency.

Figure 20:
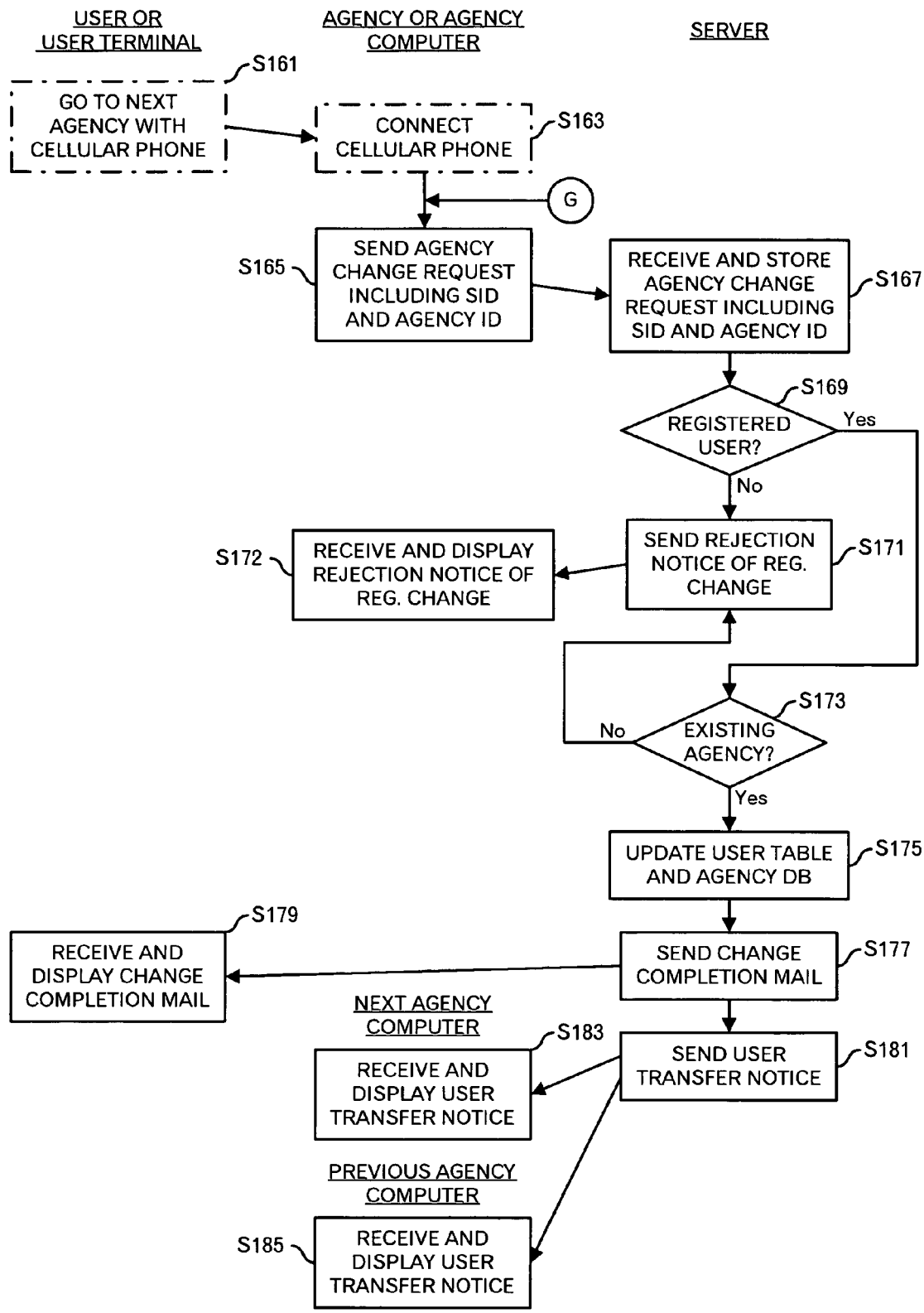
FIG. 20 is a diagram showing a processing flow of altering an agency in the embodiment of the present invention.

A process when the registered dealing agency is changed will be described with reference to FIG. 20. FIG. 20 shows a process when the user comes to a next cellular phone agency to take a proceeding. First, the user comes to a next cellular phone agency while carrying the cellular phone 3 (step S161). Upon receiving an application for agency change from the user, a staff member of the cellular phone agency connects the cellular phone 3 to be used to the agency computer 9 (step S163). The staff member operates the agency computer 9 to transmit an agency change request containing SID of the cellular phone 3 and the agency ID of a dealing agency after change to the server 5 by the Web browser or the like (step S165). SID may be read from the cellular phone 3 connected to the agency computer 9 or there may be adopted such a mechanism that SID is automatically read out by connecting to the server 5 through the cellular phone 3. The registration processor 52 of the server 5 receives the agency change request containing SID of the cellular phone 3 and the agency ID of the dealing agency after change from the agency computer 9, and temporarily stores it into the storage device (step S167). It searches the user table 61 by using the SID, and checks whether the user is a registered user or not (step S169).

If the user is judged as a non-registered user in the user table 61, the registration processor 52 of the server 5 transmits page data for rejection notification of agency registration change to the agency computer 9 (step S171). The agency computer 9 receives the page data for the rejection notification of the agency registration change from the server 5, and displays the data on the display device (step S172), thereby making the user recognize that his or her request process is incorrect. The user or the staff member of the cellular phone agency inquires to the administrator of the server 5 or the like if he or she cannot accept the rejection notification of the change.

If it is judged at the S169 that the user is a registered user, it searches the agency table (FIG. 9) in the agency DB 64 on the basis of the agency ID, and checks whether the next agency, which is designated in the agency change request, exists or not (step S173). If it is judged that a non-existing agency ID is designated, the process shifts to the step S171. On the other hand, if it is judged that the designated cellular phone agency exists, it reads out the previous agency ID registered in the column 607 of registered agency IDs so as to correspond to the user ID specified by SID from the user table 61, and then overwrites and registers the agency ID of the next agency. Moreover, it deletes the information of the user corresponding to the user ID specified by the SID from the registered user table for the previous agency in the agency DB 64. Furthermore, it registers the information of the user corresponding to the user ID specified by the SID in the registered user table for the next agency in the agency DB 64 (step S175).

Then, the registration processor 52 of the server 5 transmits a change completion mail to the user (step S177). The user operates the cellular phone 3 or the like to receive the change completion mail, and causes the user terminal to display the mail on the display device (step S179), whereby the user can recognize the completion of the agency change. Moreover, the registration processor 52 of the server 5 transmits a user transfer notice (for example, a mail) containing information of the user ID of the user who has taken the change proceeding and the like to the next agency and the previous agency (step S181). A staff member of the previous agency and a staff member of the next agency operate the agency computers 9 to receive the transfer notice containing the information of the user ID and the like, and cause to display it on the display device (steps S183 and S185).

Figure 21:
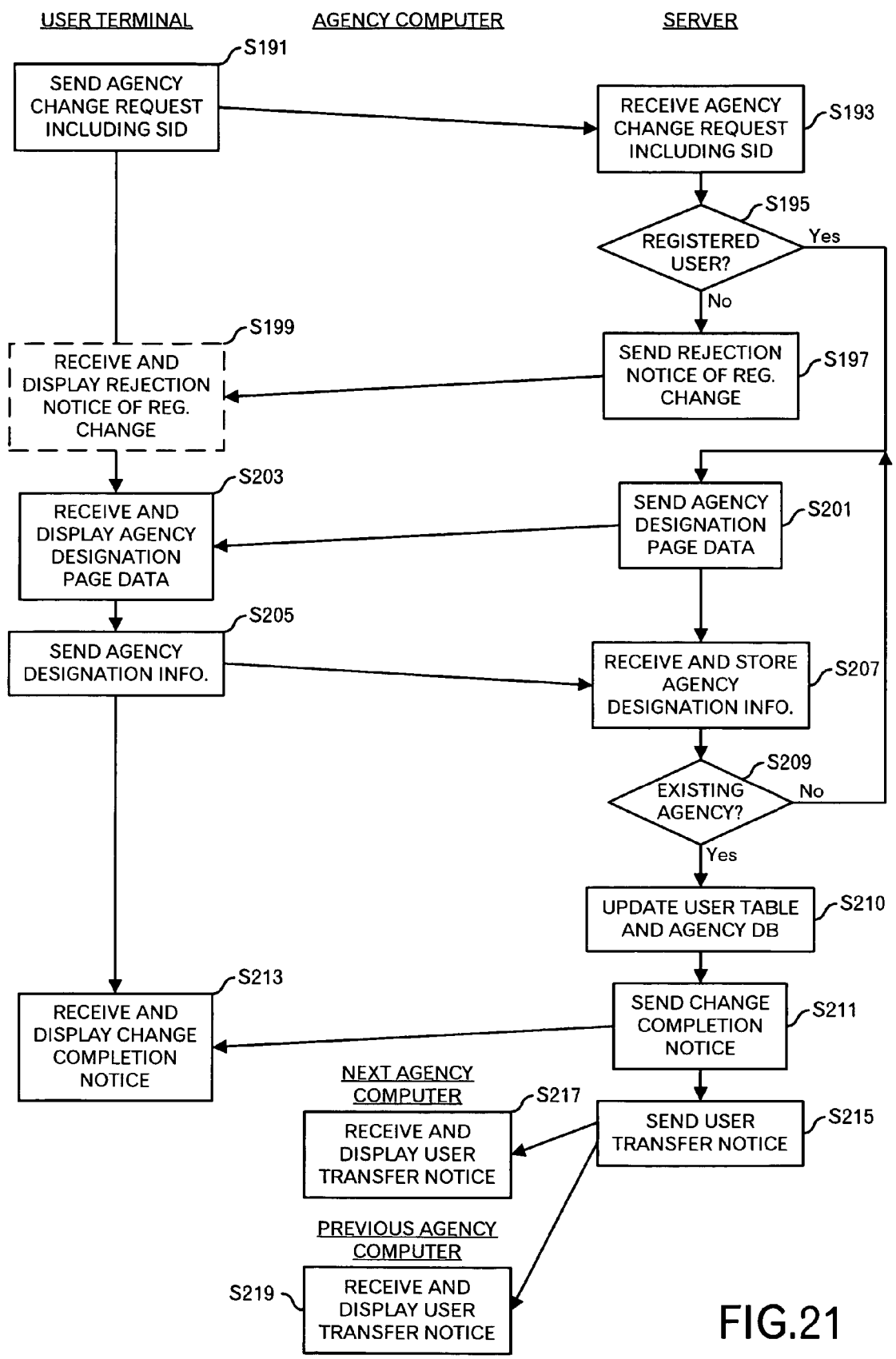
FIG. 21 is a diagram showing a processing flow of altering an agency in the embodiment of the present invention.

A process when the user carries out the agency change without going to the cellular phone agency will be described with reference to FIG. 21. The user operates the cellular phone 3 to access an agency change page of the server 5, and transmits an agency change request containing his or her subscriber ID (SID) from the agency change page (step S191). The registration processor 52 of the server 5 receives the agency change request containing SID (step S193), and searches the user table 61 by using SID, and checks whether the user has been already registered (step S195).

If the user is a non-registered user in the user table 61, the registration processor 52 of the server 5 transmits page data for rejection notification of the agency change to the cellular phone 3 (step S197). The cellular phone 3 receives the page data for the rejection notification of the agency change from the server 5, and displays the data on the display device (step S199), thereby making the user recognize that his or her request process is incorrect. The user inquires to the administrator of the server 5 or the like when he or she cannot accept the rejection notification of this change.

If it is judged at the step S195 that the user is a registered user, the registration processor 52 of the server 5 transmits to the cellular phone 3, an agency designation page data for making the user designate an agency (step S201). When receiving the agency designation page data from the server 5, the cellular phone 3 displays the data on the display device (step S203). The user selects a next cellular phone agency from a list of selectable agencies or agencies in a user residence district, which is displayed on the display device, and clicks the transmission button, for example. Then, the cellular phone 3 transmits agency designation information containing the agency ID of the next cellular phone agency to the server 5 (step S205). The registration processor 52 of the server 5 receives the agency designation information from the cellular phone 3, and temporarily stores the information into the storage device (step S207). Then, it searches the agency table (FIG. 9) in the agency DB 64 on the basis of the agency ID of the next cellular phone agency, and checks whether the next designated agency is an existing agent or not (step S209). If it is judged that the agency ID is the agency ID of a non-existing agent for some reason, the process shifts to the step S201 to make the user designate an agency again. On the other hand, if it is judged that the agency designated is an existing cellular phone agency, it reads out the agency ID of the previous agency, which is registered in the column 607 of registered agency IDs so as to correspond to the user ID specified by the SID in the user table 61, and also overwrites and registers the agency ID of the next agency. Moreover, in the registered user table for the previous agency in the agency DB 64, it deletes the information of the user corresponding to the user ID specified by the SID. Furthermore, in the registered user table for the next agency in the agency DB 64, it registers the information of the user corresponding to the user ID specified by the SID (step S210).

Then, the registration processor 52 of the server 5 transmits a change completion notification to the cellular phone 3 (step S211). The cellular phone 3 receives the change completion notification, and displays it on the display device (step S213) whereby the user can recognize the completion of the agency change. Moreover, the registration processor 52 of the server 5 transmits to the previous agency and the next agency, a user transfer notification (for example, a mail) containing information on the user ID of the user for which the change proceeding is carried out, and the like (step S215). A staff member of the previous agency and a staff member of the next agency operate the agency computers 9 to receive the transfer notification containing the information on the user ID and the like, and display it on the display device (steps S217 and S219).

Figure 22:
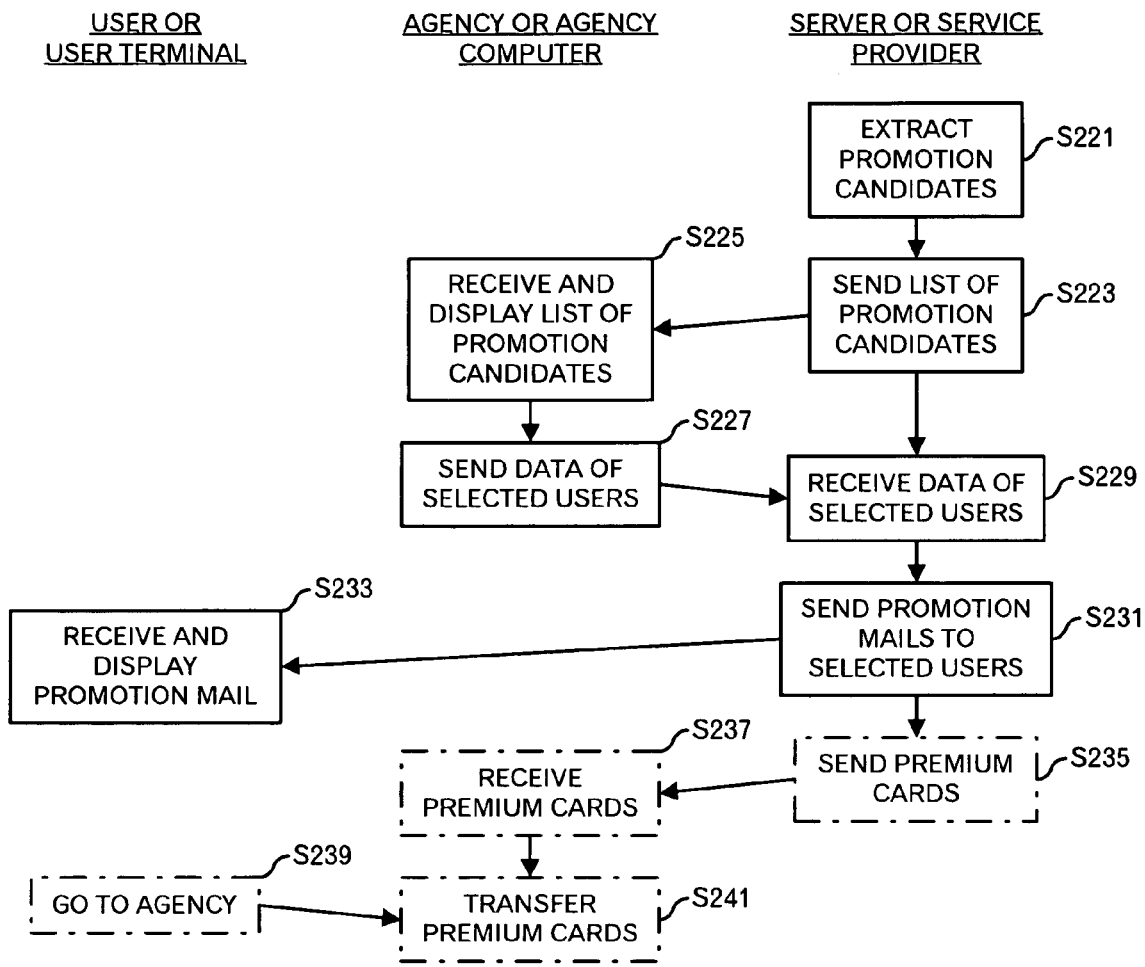
FIG. 22 is a diagram showing a processing flow for promotion activities in the embodiment of the present invention.

Next, a process when promotion activities to promote utilization of network card games by users are carried out will be described with reference to FIG. 22. First, an agency assistance processor 56 of the server 5 refers to the user table 61, the game win/loss management table 65, the transfer management table 63, the agency DB 64 and the like to extract promotion candidates on the basis of a predetermined criterion and store them into the storage device (step S221). With respect to an example of the criterion for the promotion candidate extraction, it extracts a user who owns many cards, but has had no access for a predetermined period or more since the last game play, or a user for which the accumulated value of the potlatch point is large or the point value increases remarkably. Moreover, when the service provider also serves as a communication carrier, a combination of data on communication charges, data on the frequency of mail transmission by a cellular phone and the like may be used as an extraction criterion.

When promotion candidates are extracted, the agency assistance processor 56 collects the promotion candidates every agency ID to generate lists of promotion candidates, and transmits the lists of the promotion candidates to the respective cellular phone agency (step S223). Incidentally, the transmission may be carried out by using mail, or there may be adopted such a mechanism that a dedicated page is provided for each cellular phone agency, a mail to promote access to the dedicated page is transmitted, and the dedicated page data is transmitted in response to the access from each agency computer 9. When receiving the list of the promotion candidates from the server 5, the agency computer 9 displays it on the display device (step S225). A staff member of the cellular phone agency looks at the list of the promotion candidates to settle actual promotion targets. Incidentally, all the candidates described on the list of the promotion candidates may be selected. The staff member of the cellular phone agency operates the agency computer 9 to transmit the data of the users selected as the promotion targets to the server 5 (step S227). When receiving the data of the selected users from the agency computer 9, the agency assistance processor 56 of the server 5 temporarily stores it into the storage device (step S229). Then, the agency assistance processor 56 extracts the mail addresses of the selected users from the user table 61 and transmits the promotion mail to each selected user (step S231). The user operates the cellular phone 3 or the like to receive the promotion mail transmitted from the server 5 (step S233). Accordingly, the user knows that he or she can obtain a premium card if he or she goes to a registered dealing agency.

The service provider sends each cellular phone agency premium cards to be distributed to users (step S235), and each cellular phone agency receives the premium cards from the service provider (step S237) and waits for promotion targets coming to the store. When a user who received the promotion mail comes to the registered dealing agency (step S239) and requests for distribution of premium cards, a staff member of the cellular phone agency transfers the premium cards to the user (step S241). Incidentally, when the premium cards are transferred, a confirmation process using the cellular phone 3 or a confirmation process to the agency assistance processor 56 of the server 5 by using the agency computer 9 is carried out, so that the completion of the transfer is registered. Accordingly, the cellular phone agency can prompt users to come to the store and obtain opportunities to sell other articles. Moreover, through the promotion, the service provider can promote further utilization of the network card games. When receiving new cards, the user carries out the card addition registration described with reference to FIGS. 17 to 19, for example, so that the user can enjoy a game with the new cards.

Figure 23:
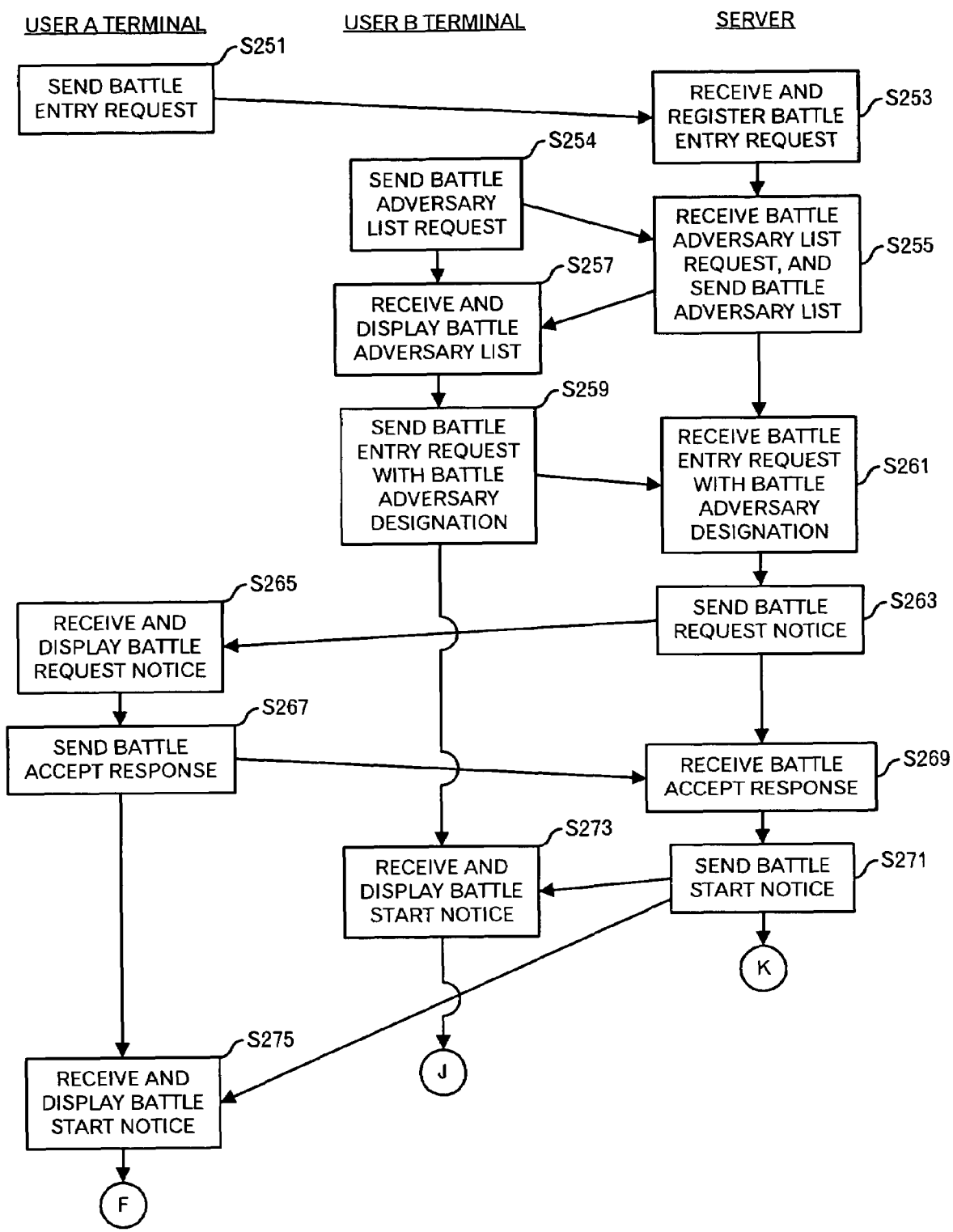
FIG. 23 is a diagram showing a processing flow when a game is played in the embodiment of the present invention.

Next, a process when a network card game is played will be described with reference to FIG. 23. In the following description, it is assumed that the network card game is played by two users, that is, users A and B fight a battle. The user A operates the cellular phone 3 of the user A to access the server 5, and transmits a battle entry request from a battle offer page to the server 5 (step S251). When receiving the battle entry request from the cellular phone 3 of the user A, the game processor 51 of the server 5 registers the battle entry request concerned into a battle entry storage for registering users looking for battle adversaries (step S253).

On the other hand, the user B looking for a batter adversary operates the cellular phone 4 of the user B to access the server 5, and transmits a battle adversary list request to the server 5 (step S254). Upon receiving the battle adversary list request from the cellular phone 4, the game processor 51 of the server 5 extracts users looking for a battle adversary from the battle entry storage, generates battle adversary list page data and then transmits the page data to the cellular phone 4. (step S255). The cellular phone 4 receives the battle adversary list page data from the server 5 and displays the data on the display device (step S257).

The user B selects from the battle adversary list, a user with whom the user B wants to fight a battle. In this case, the user A is assumed to be selected. Then, the cellular phone 4 transmits a battle entry request with battle adversary designation to the server 5 (step S259). The game processor 51 of the server 5 receives the battle entry request with the battle adversary designation from the cellular phone 4, and temporarily stores the request into the storage device (step S261). Then, it refers to information on the designated battle adversary in the battle entry storage again, and checks whether no battle adversary has been settled for the designated battle adversary and the battle adversary concerned has not yet withdrawn the battle entry. If it is confirmed that no battery adversary has been settled and the battle entry has not yet been withdrawn, it transmits a battle request notice containing information of a battle request source user to the user A (step S263). The user A operates the cellular phone 3 to receive the battle request notice containing the information on the battle request source user and display the notice on the display device (step S265).

The user A looks at the information of the battle request source user to judge whether the battle request should be accepted or not. If the user A does not accept the battle request, the user A transmits no battle accept response, for example. For example, when receiving no battle accept response within a predetermined time after the transmission of the battle request notice, the game processor 51 of the server 5 judges that the battle is not realized, and notifies the transmission source user of the battle entry request with the battle adversary designation to that effect.

Here, it is assumed that the user A accepts the battle request. In this case, the user A operates the cellular phone 3 to transmit a battle accept response to the server 5 (step S267). The game processor 51 of the server 5 receives the battle accept response from the cellular phone 3 (step S269). The game processor 51 transmits a battle start notice to the cellular phone 3 operated by the user A and the cellular phone 4 operated by the user B (step S271). The cellular phone 3 and the cellular phone 4 receive the battle start notice from the server 5, and display it on the display device (steps S273 and S275). The process shifts to steps in FIG. 24 through terminals F, J and K.

Figure 24:
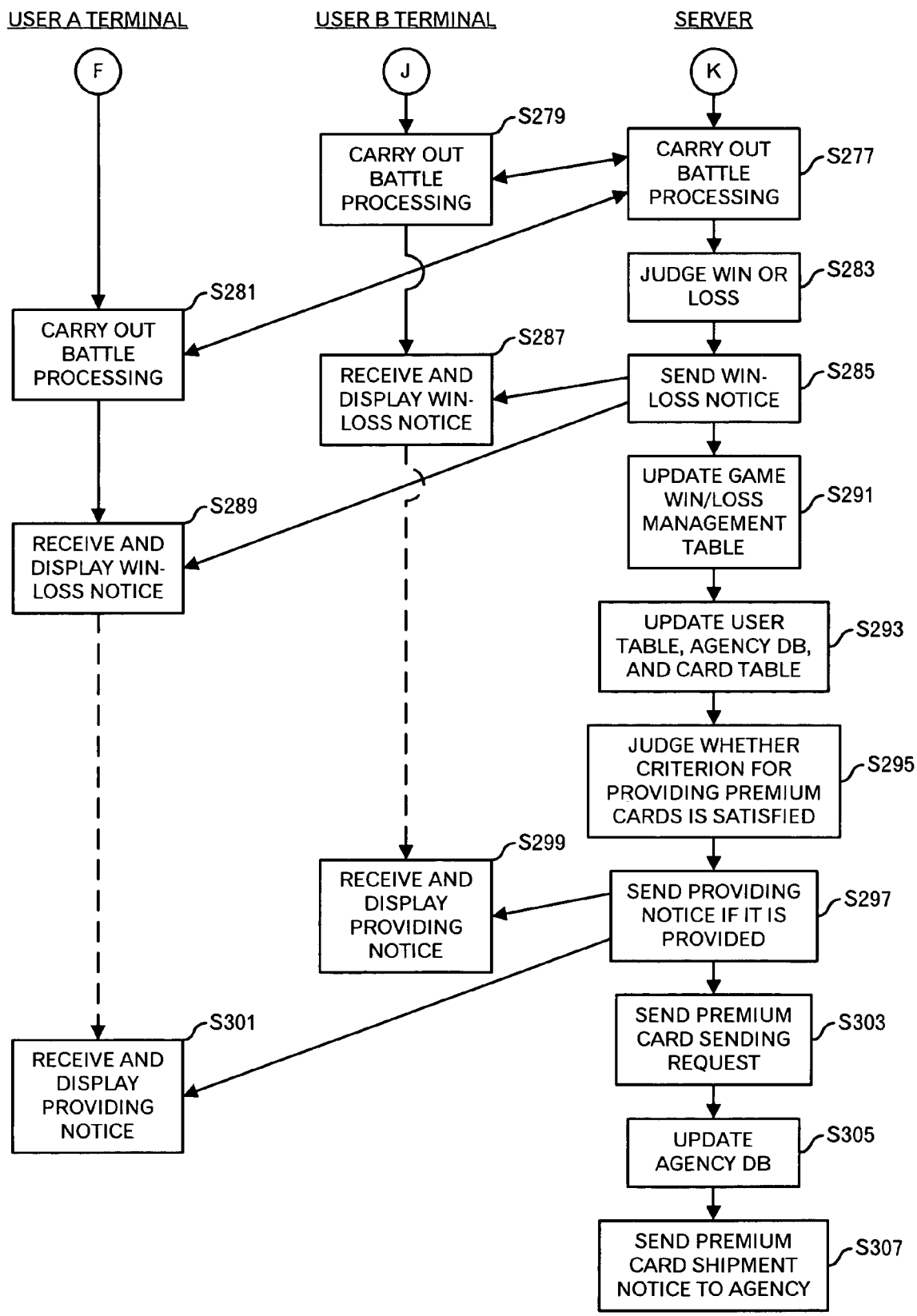
FIG. 24 is a diagram showing a processing flow when a game is played in the embodiment of the present invention.

In FIG. 24, the game processor 51 of the server 5, the cellular phone 3 and the cellular phone 4 execute the process for the network card game according to a predetermined rule (steps S277, S279 and S281). Each user starts a process of selecting cards installed onto the deck from the held cards. Incidentally, any game rule may be applied in this embodiment, and thus the detailed description thereof is omitted. However, the marketing processor 55 may insert an advertisement appropriate for battle fighters during the process of the game.

The game processor 51 refers to the reference to determine win or loss, which is predetermined as a game rule, and the progress state of the game to judge win or loss (step S283). When the win or loss is determined, it transmits a win-loss notice to the cellular phone 3 and the cellular phone 4 (step S285). The cellular phone 3 and the cellular phone 4 receive the win-loss notice from the server 5 and displays the notice on the display device (steps S287 and S289). The win-loss notice may contain not only the win-loss result, but also the total win-loss information of each user, for example.

When the win-loss is determined, the game processor 51 of the server 5 registers the user A, the user B, the date and the user ID of the winner in the game win/loss management table 65 (step S291). At the game start time, a record may be generated in the game win/loss management table 65 to register the user A and the user B in the record.

Moreover, the game processor 51 of the server 5 registers the amount of money to which the current game utilizing fee is added in the column 608 of game utilizing fees so as to correspond to the user A and the user B in the user table 61. In addition, it registers the respective amount of money to which the current game utilizing fee is added in the column 652 of utilizing fees so as to correspond to each of the user A and the user B in each registered user table (FIG. 10) for the user A and the user B in the agency DB 64, and updates the total utilizing fee. Furthermore, it also updates the value in the column 648 of the total utilizing amount of registered users in the agency table (FIG. 9). Moreover, when the status of the card used in the game is varied through the battle, it registers information on the status after the variation in the column 628 of statuses in games in the card table 62, and when the value of the card level is varied, it registers the value after the variation in the column 626 of card levels (step S293). Incidentally, the status variation and the card level may be registered in the card table 62 in the course of the game.

Next, the agency assistance processor 56 judges whether a predetermined criterion for providing premium cards is satisfied (step S295). For example, by referring to the win-loss information of the users A and B, which is registered in the game win/loss management table 65, it judges whether the predetermined criterion for providing premium cards, such as winning the games total 10 times, or continuously winning the games five times, is satisfied. The type of the premium card to be provided may be varied in accordance with the number of wins. If it is judged that the criterion for providing premium cards is satisfied, it transmits a premium card providing notice to the user A or the user B (step S297). The user A or the user B operates the cellular phone 3 or the cellular phone 4 to receive the premium card providing notice and display the notice on the display device (steps S299 and S301), whereby the user A or the user B recognizes his or her obtainment of the premium cards. The user A or the user B goes to a registered dealing agency to receive the premium cards.

In order to transfer premium cards from the registered dealing agency to the user A or the user B, the agency assistance processor 56 transmits to the game planning company, a premium card sending request containing information of the delivery destination cellular phone agency and information of the premium cards to be provided (step S303). The game planning company receives the premium card sending request containing the information of the delivery destination cellular phone agency and the information of the premium cards, and sends the premium card concerned to the delivery destination cellular phone agency concerned. Moreover, it registers IDs of the premium cards to be provided so as to correspond to the user A or B provided with the premium cards in the column 654 of IDs of cards being held in the registered user table for the delivery destination cellular phone agency in the agency DB 64 (step S305). The holding flag 653 in the registered user table is also changed to "Yes". It generates new records for the provided premium cards in the card table 62, registers the information of the cards in the records and also registers information such as "before transfer" or "before shipment" as a distribution status in the record. In addition, the agency assistance processor 56 transmits to the delivery destination cellular phone agency, a premium card shipment notice containing ID of the user A or B to which the premium card was provided and IDs of the provided premium cards (step S307). A staff member of the cellular phone agency operates the agency computer 9 to receive the premium card shipment notice and display the notice on the display device, whereby the cellular phone agency can smoothly deal with the user coming to the store.

Figure 25:
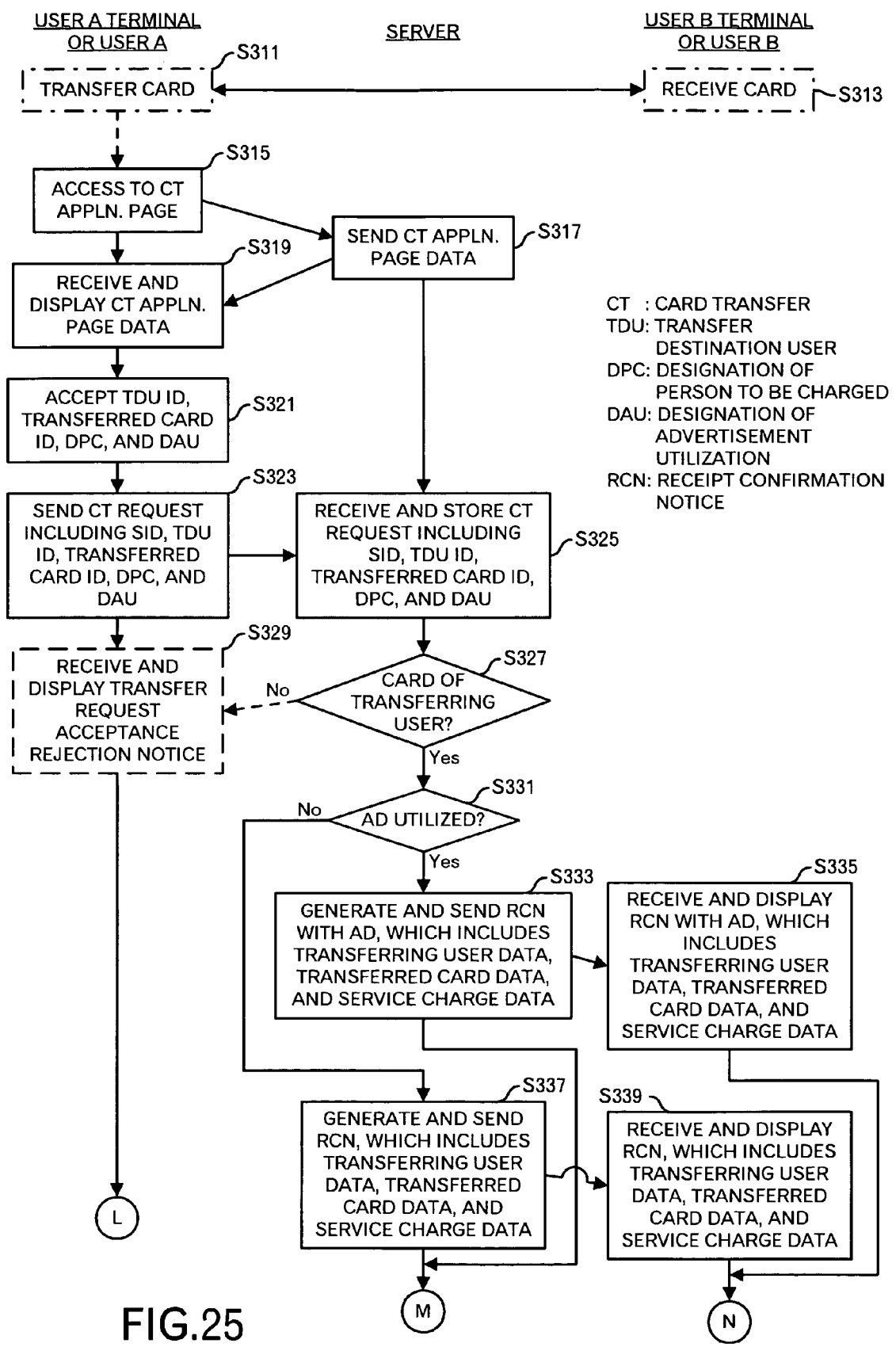
FIG. 25 is a diagram showing a processing flow for a card transfer in the embodiment of the present invention.
Figure 26:
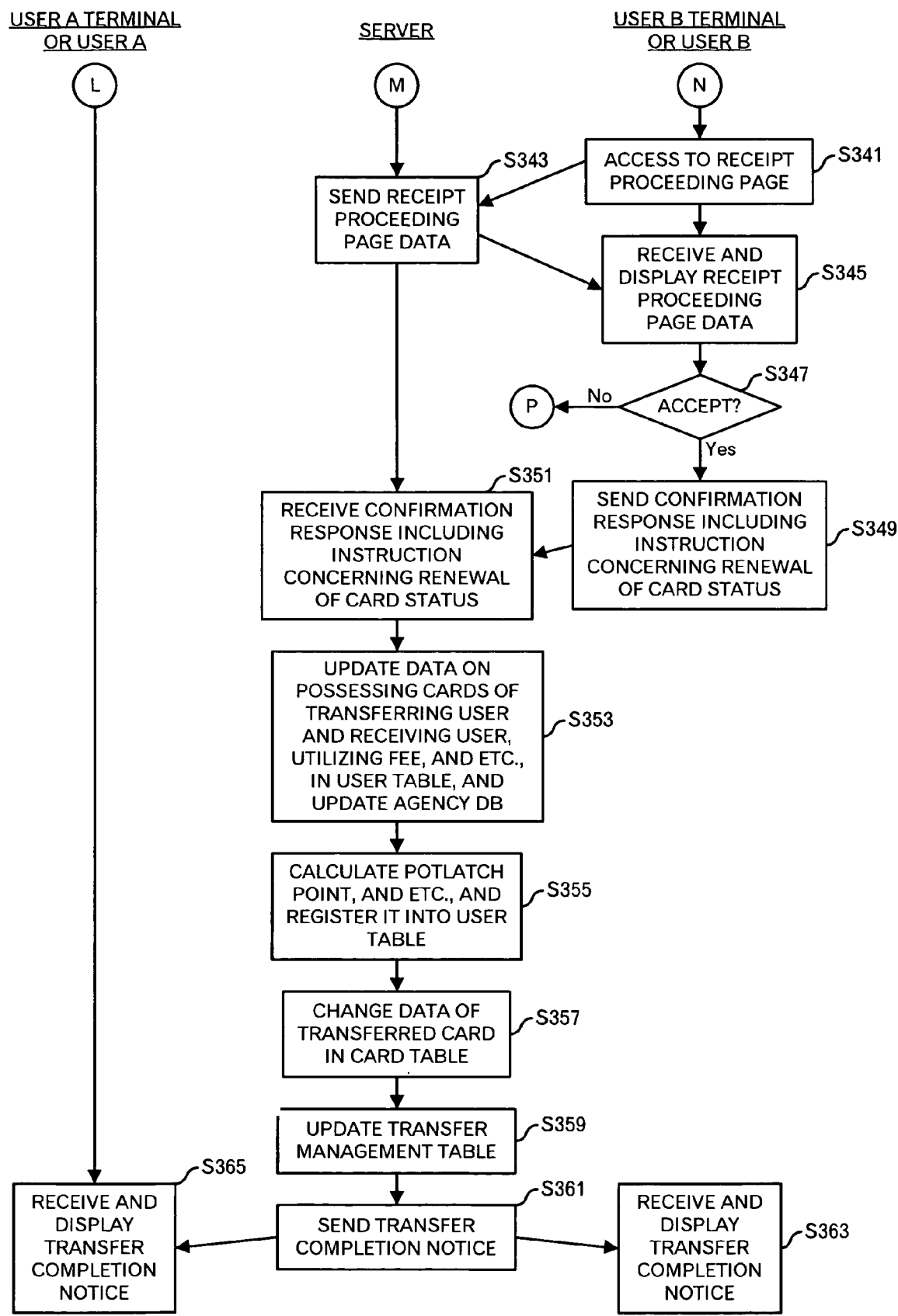
FIG. 26 is a diagram showing a processing flow for the card transfer in the embodiment of the present invention.

Next, a process when the card transfer is carried out will be described with reference to FIGS. 25 and 26. In the following description, it is assumed that a card is transferred from the user A to the user B. For example, the user A transfers an actual card to the user B (step S311), and the user B receives the actual card from the user A (step S313). Incidentally, the card transfer in this embodiment is treated so that transfer of an actual card and transfer of a card in the network card game are discriminated from each other. That is, it is possible to transfer only a card in the network card game without transferring any actual card. Accordingly, in the following description, it is assumed that an actual card is first transferred, however, it may be finally transferred or no actual card may be transferred.

Subsequently, the user A operates the cellular phone 3 to access a card transfer application page of the server 5 (step S315). The card transfer processor 53 of the server 5 transmits card transfer application page data to the cellular phone 3 in response to the access (step S317). The cellular phone 3 receives the card transfer application page data from the server 5 and displays the data on the display device (step S319). The user A inputs each of the transfer destination user ID, the transfer card ID, designation of a person to be charged for transfer service charge (for example, transfer source payment, transfer destination payment or utilization of advertisement rate) and designation concerning advertisement utilization into each input column of the card transfer application page. The cellular phone 3 accepts the subscriber ID (SID) or the transfer source user ID, the transfer destination user ID, the transfer card ID, the designation of the person to be charged for transfer service charge and the designation concerning the advertisement utilization (step S321), and transmits a card transfer request containing such information to the server 5 in response to a transmission instruction from the user A (step S323). With respect to the person to be charged for the transfer service charge, because it is a problem to charge a partner user for the card transfer service charge when status laundering is carried out, the transfer source user designates the person to be charged for the card transfer service charge in this embodiment. However, it may be possible to necessarily set the transfer destination user or the transfer source user as the person to be charged. Furthermore, by designating the advertisement utilization, the card transfer service charge can be lowered.

The card transfer processor 53 of the server 5 receives from the cellular phone 3, the card transfer request containing SID or the transfer source user ID, the transfer destination user ID, the transfer card ID, the designation of the person to be charged for the transfer service charge and the designation concerning the advertisement utilization, and temporarily stores the request into the storage device (step S325). It searches the card table 62 on the basis of the transfer card ID contained in the card transfer request, and checks whether the user ID specified by the received SID or the received transfer source user ID is registered as a possessing user ID so as to correspond to the transfer card ID (step S327). That is, it judges whether the transfer source user is an owner having a true right of possession of the transfer card concerned. If it is judged that neither the user ID specified by the received SID nor the received transfer source user ID is stored as the possessing user ID in the card table 62 so as to correspond to the transfer ID and thus the card transfer request is not transmitted from any true transfer source user, the card transfer processor 53 transmits a transfer request acceptance rejection notice to the cellular phone 3. The cellular phone 3 receives the transfer request acceptance rejection notice from the server 5 and displays the notice on the display device (step S329). The user looks at the display device of the cellular phone 3 and recognizes that he or she makes an incorrect input of the card ID. In this case, the user can carry out the transfer process from the step S315 again.

On the other hand, if the transfer source user is judged as an owner having a true right of possession of the card to be transferred, it judged whether the advertisement utilization is designated or not (step S331). If the advertisement utilization is designated, it instructs the marketing processor 55 to extract appropriate advertisements. For example, the marketing processor 55 selects proper advertisements from the data of the transfer destination user or transfer source user or the data of both the users in the user table 61. The marketing processor 55 outputs the data of the advertisements concerned to the card transfer processor 53. The card transfer processor 53 generates a receipt confirmation notice with advertisements, which includes data of the transferring person, data of the transfer card and the service charge data (for example, data on the amount of money (containing the transfer cost if occasion demands), a charged person, and the like), and transmits the notice to the user B who is the transfer destination by a mail (step S333). Incidentally, the card transfer service charge is lowered because the advertisements are attached. Moreover, the receipt confirmation notice with advertisements may contain a link to the receipt proceeding page (Uniform Resource Locator (URL)), for example. By referring to the user table 61, it extracts the mail address of the user B based on the transfer destination user ID, and transmits the mail to the user B. The user B operates the cellular phone 4 to receive the receipt confirmation notice with advertisements, which contains the data of the transferring person, the data of the transfer card and the service charge data (for example, data on the amount of money (containing the transfer cost if occasion demands), a charged person, and the like) and display the notice on the display device (step S335). Accordingly, the user B can know a card, which the user B receives and a condition under which the user B receives the card. Thereafter, the process goes to a process in FIG. 26 through a terminal N.

On the other hand, when no advertisement utilization is designated, it generates a receipt confirmation notice containing the data of the transferring person, the data of the transfer card and the service charge data, and transmits the notice to the user B who is the transfer destination user by a mail (step S337). The receipt confirmation notice may contain a link (URL) to the receipt proceeding page, for example. The user B operates the cellular phone 4 to receive the receipt confirmation notice containing the data of the transferring person, the data of the transfer card and the service charge (for example, the data on the amount of money (containing a transfer cost if occasion demands), a charged person, and the like) and display the notice on the display device (step S339). Accordingly, the user B can know a card, which the user B receives and a condition under which the user B receives the card. The process is shifted to the process in FIG. 26 through terminals L, N and M.

The user B checks the contents of the receipt confirmation notice and selects the link (URL) to the receipt proceeding page contained in the receipt confirmation notice, for example, so that the cellular phone 4 accesses the receipt proceeding page (step S341). The card transfer processor 53 of the server 5 transmits the receipt proceeding page data to the cellular phone 4 in response to the access (step S343). The cellular phone 4 receives the receipt proceeding page data from the server 5 and displays the data on the display device (step S345). The receipt proceeding page contains at least a display column containing the data of the transfer card, the data of the transferring person and the service charge data (for example, the data on the amount of money (containing a transfer cost if occasion demands), a charged person, and the like), a selection column for selecting "accept" or "not accept" of the offer of the transfer, and an instruction selection column for update of the card status.

Figure 27:
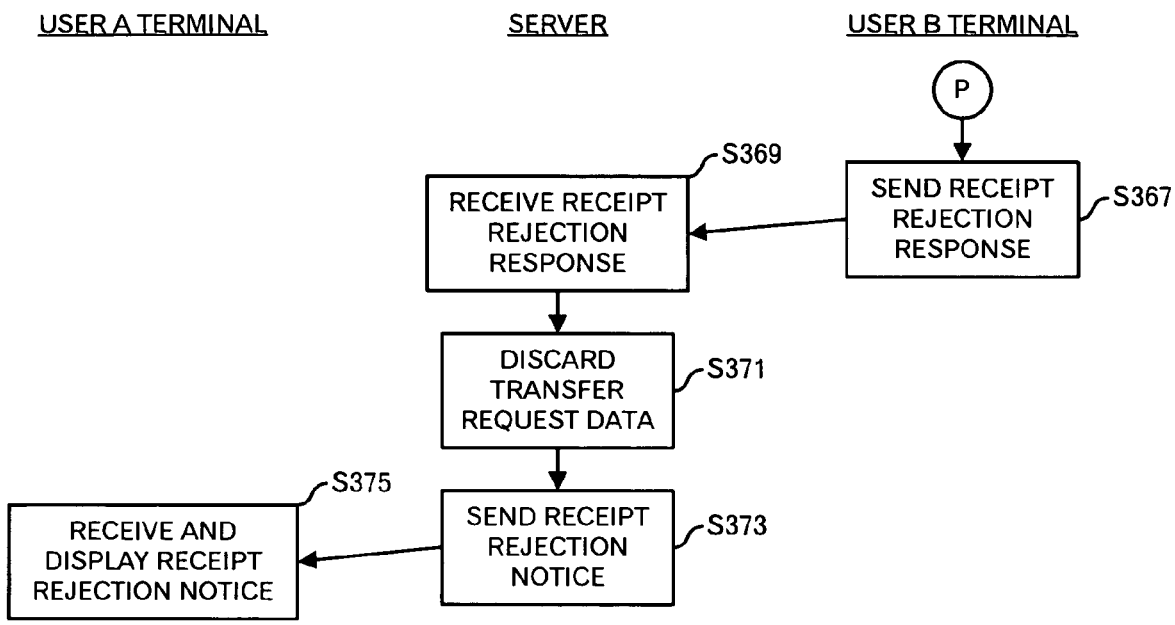
FIG. 27 is a diagram showing a processing flow for the card transfer in the embodiment of the present invention.

The user B judges whether the offer of the transfer is accepted or not. If the user B does not accept, he or she selects a choice of "not accept" in the selection column, and instructs the submittal (step S347). Then, the information on the choice of "not accept" is transmitted to the server 5. The details of this process are shown in FIG. 27.

On the other hand, when the user B accepts the offer of the transfer in consideration with matters such as the service charge, the user B selects a choice of "accept" in the selection column for selecting "accept" or "not accept" of the offer of the transfer (step S347). Furthermore, the user B selects "renewal" or "maintain" in the instruction selection column for the update of the card status. For example, in the case of the status laundering, the transfer is carried out to clear the damage status such as the dead status, the cursed state or other damaged statuses, and thus "renewal" is selected. On the other hand, the card status is not necessarily limited to the damage status, and thus a choice for keeping the card state to the present status may be selected when the card is now under another advantageous status. When the user B instructs the submittal, the cellular phone 4 transmits to the server 5, a confirmation response containing an instruction concerning the renewal of the card status (step S349).

The card transfer processor 53 of the server 5 receives the confirmation response containing the instruction concerning the renewal of the card status from the cellular phone 4, and temporarily stores the response into the storage device (step S351) Then, the card transfer processor 53 of the server 5 updates the data of the possessed cards of the transferring user and the receiving user, the data of the amount of money of the utilizing fee and the like in the user table 61 (step S353). That is, in the user table 61, it deletes the transferred card ID registered in the column 611 of possessed card IDs so as to correspond to the user ID of the transferring user, and registers the transferred card ID in the column 611 of possessed card IDs so as to correspond to the user ID of the receiving user. Moreover, the card transfer processor 53 of the server 5 increases the value of the utilizing fee of the user designated as the person to be charged for the card transfer service charge by only the amount corresponding to the current card transfer service charge in the registered user table for the registered dealing agency of the user designated as the person to be charged for the card transfer service charge in the agency DB 64, and registers the total utilizing fee into the column 652 of utilizing fees. Furthermore, it also increases the total utilizing amount of registered users for the registered dealing agency of the user concerned by only the amount corresponding to the current card transfer service charge in the agency table, and registers the value in the column 648 of total utilizing amount of registered users.

The point processor 54 of the server 5 calculates the potlatch point, increases the current value and accumulated value of the potlatch point by only the currently obtained potlatch point, and then registers these values into the user table 61 in association with the transfer source user ID (step S355).

Here, the potlatch point will be described in detail. The potlatch point is a point, which is provided to the transfer source user when the right of possession of cards on the network is transferred between users, and it is represented by a one-dimensional numerical value or two or more dimensional vector, for example. Furthermore, as described above, the accumulated value of the potlatch point, which is mainly used for marketing and promotion, and the current value of the potlatch point used for exchange with the premium card or the like are held, and these values are accumulated every time a potlatch point occurs. The current value of the potlatch point is invalidated due to lapse of a predetermined term, for example.

In this embodiment, the potlatch point is a function of at least one of the level of the transferred card, the rarity thereof, the number of cards and the attribute of the card. The level of the card represents an experience value which has been accumulated for a card entity according to a predetermined rule on the basis of the play results of the network card game, or the value of a growth stage based on the experience value, and as the level of a card to be transferred is higher, the potlatch point is increased. The rarity of a card is defined as the reciprocal number of the rate of the issuance number of the card concerned to the total number of all the issued cards or as the reciprocal number of the occupational rate of the card concerned to a fixed number of cards to be distributed. In this case, as the rarity of a card to be transferred is higher, the potlatch point is increased. Moreover, as the number of cards to be transferred once is larger, the potlatch point is assumed to be increased. Furthermore, with respect to the attributes of the cards, an attribute determined on the basis of a combination of attributes allocated to cards is allocated to the potlatch point, like a case where an attribute C is allocated to the potlatch point when a card having an attribute A and a card B having an attribute B are transferred at the same time. However, there is a case where a card has no attribute, and in this case, the attribute is not required to be taken into consideration.

Here, a calculation example of the potlatch point given to the user A when four cards are transferred from the user A to the user B will be described. Here, it is assumed that the levels of the cards to be transferred are set to 2, 1, 3, 4, and the rarities of the cards are set to 10, 15, 25, 100. The attributes of the cards are represented by a matrix having four rows and two columns, and when an attribute matrix of a card a1 is represented by A1, an attribute matrix of a card a2 is represented by A2, an attribute matrix of a card a3 is represented by A3, and an attribute matrix of a card a4 is represented by a4, the attributes of the cards are represented as follows:

$$A1 = \begin{bmatrix} 1 & 3 \\ 2 & 2 \\ 3 & 2 \\ 4 & 3 \end{bmatrix} \quad A2 = \begin{bmatrix} 2 & 1 \\ 3 & 1 \\ 2 & 2 \\ 1 & 1 \end{bmatrix} \quad A3 = \begin{bmatrix} 4 & 1 \\ 1 & 3 \\ 1 & 1 \\ 2 & 3 \end{bmatrix} \quad A4 = \begin{bmatrix} 3 & 2 \\ 2 & 2 \\ 1 & 1 \\ 1 & 3 \end{bmatrix}$$

Here, when the potlatch point to be provided is represented by PPa, the absolute value thereof |PPa| is represented by the following equation:

|PPa|=log{number of cards×(maximum level+(second highest level)/2+(third highest level)/3+(fourth highest level)/4)×(maximum rarity+(second highest rarity)/2+(third highest rarity)/3+(fourth highest rarity)/4)$^2$}=log{4×(4+3/2+2/3+1/4)× (100+25/2+15/3+10/4)$^2$}=12.82

The attribute ATa is calculated by the following equation:

$$ATa = \begin{bmatrix} C\begin{bmatrix} 1 & 0 \\ 0 & -1 \end{bmatrix} A4^t & C\begin{bmatrix} 0 & 1 \\ -1 & 0 \end{bmatrix} A4^t \end{bmatrix}$$

$$C = \begin{bmatrix} B\begin{bmatrix} 1 & 0 \\ 0 & -1 \end{bmatrix} A3^t & B\begin{bmatrix} 0 & 1 \\ -1 & 0 \end{bmatrix} A3^t \end{bmatrix}$$

$$B = \begin{bmatrix} A1\begin{bmatrix} 1 & 0 \\ 0 & -1 \end{bmatrix} A2^t & A1\begin{bmatrix} 0 & 1 \\ -1 & 0 \end{bmatrix} A2^t \end{bmatrix}$$

When the calculation is carried out by substituting the matrixes A1 to A4 described above into the above equation, the following equations are obtained.

$$B = \begin{bmatrix} 1 & 5 \\ 4 & 4 \\ 2 & 2 \\ 1 & 1 \end{bmatrix}$$

$$C = \begin{bmatrix} 1 & 19 \\ 8 & 8 \\ 0 & 0 \\ 1 & 1 \end{bmatrix}$$

$$ATa = \begin{bmatrix} 35 & 35 \\ 0 & 0 \\ 0 & 0 \\ 2 & 2 \end{bmatrix}$$

For example, the accumulated value ΣPP of the potlatch point is calculated as follows by using the potlatch point |PPan| (n represents a positive integer and indicates n-th transfer) given every time card transfer is carried out.

ΣPP=(|PPa1|+|PPa2|+ . . . +|PPan|)

That is, the accumulated value is obtained by simple summation. Even when the potlatch point is exchanged with a premium card or the like, the accumulated value ΣPP of the potlatch point is not reduced. However, the potlatch point may be set so that if a predetermined term, for example, one year elapses, potlatch points obtained before one year may be invalidated.

On the other hand, the current value ΣPPc of the potlatch point is calculated as follows by using the potlatch point |PPan| given every time the card transfer is carried out and a used point use $|PPam|$ (m represents a positive integer and indicates an m-th point exchange).

$$\Sigma PPc = (|PPa1| + \ldots + |PPan|) - (\text{use}|PPa1| + \ldots + \text{use}|PPam|)$$

Moreover, the current attribute value ATac of the potlatch point is a function of at least one of a preceding attribute ATa(n-1), the attribute ATan of an obtained potlatch point, and a preceding current potlatch point $\Sigma PPc$, and an obtained potlatch point $|PPa|$, and it is calculated as follows, for example.

$$ATac = \Sigma PPc \cdot Ata(n-1) + |PPan| \cdot ATan$$

In a case where a special privilege such as a premium card is obtained, it is required to hold, as the current value of the potlatch point, a point number equal to or more than a predetermined point number which is needed to exchange the point number with a premium card and set for the premium card concerned in advance, and the card having the same attribute as the attribute of the current value of the potlatch point is provided to the user. Incidentally, the premium card may be provided by using only the current value of the potlatch point without using any attribute. In this case, there may be adopted such a configuration that the user may select an obtainable card from cards having various attributes. Moreover, with respect to the attribute, simply, each attribute state of earth, water, fire, and wind may be cyclically shifted. That is, one transfer shifts the attribute from earth to water, and one more transfer shifts the attribute from water to fire. If such a simple method is adopted, the user can enjoy to find out what attribute of card can be achieved in what transfer manner.

The current value and accumulated value of the potlatch point, which are calculated by the point processor 54 as described above, and the attribute if occasion demands, are registered in the columns 609, 610 and the like in the user table 61 in association with the user ID of the transfer source user (step S355). Moreover, the card transfer processor 53 refers to the content of an instruction concerning the renewal of the card status, which is contained in the confirmation response from the user B. When it is instructed to clear the status, it registers "normal state" in association with the transferred card ID in the card table 62, and also changes the possessing user ID from the user ID of the transferring user to the user ID of the receiving user (step S357).

Furthermore, the card transfer processor 53 adds a new record to the transfer management table 63 to register information on the transfer source user ID, the transfer destination user ID, the card ID, the date and time, the service charge, the user to be charged for the service charge and the like (step S359). When these process described above have been completed, it transmits the transfer completion notice to the user A and the user B (step S361). With respect to the cellular phone 4 of the user B, the transfer completion notice may be transmitted as Web page data, or the notice may be transmitted by a mail. For the user A, the notice is transmitted by a mail. The user A and the user B operate the cellular phone 3 and the cellular phone 4 to receive the transfer completion notice and display the notice on the display device (steps S363 and S365).

By executing the process described above, the right of possession of cards on the network can be transferred. A potlatch point is provided to a transfer source user, so that the transfer is promoted. Furthermore, the status of a card falling into a damage status can be cleared, so that the transfer makes it possible to effectively use the same card again.

Incidentally, a process after the terminal P will be described with reference to FIG. 27. When at the step S347, the user B judges not to accept the offer of the transfer and also selects the choice "not accept" in the selection column and then instructs the submittal, the cellular phone 4 transmits the receipt rejection response to the server 5 (step S367). When receiving the receipt rejection response from the cellular phone 4 (step S369), the card transfer processor 53 of the server 5 discards the data of the transfer request stored temporarily in the storage device (step S371), obtains a mail address from the user table 61 on the basis of the user ID of the transfer source user and transmits the receipt rejection notice to the user A who is the transfer source user (step S373). For example, a mail to the effect that the user B rejected the receipt is transmitted. The user A operates the cellular phone 3 to receive the receipt rejection notice from the server 5 and causes to display the notice on the display device (step S375). Accordingly, the user A can recognize that the transfer fails.

Figure 28:
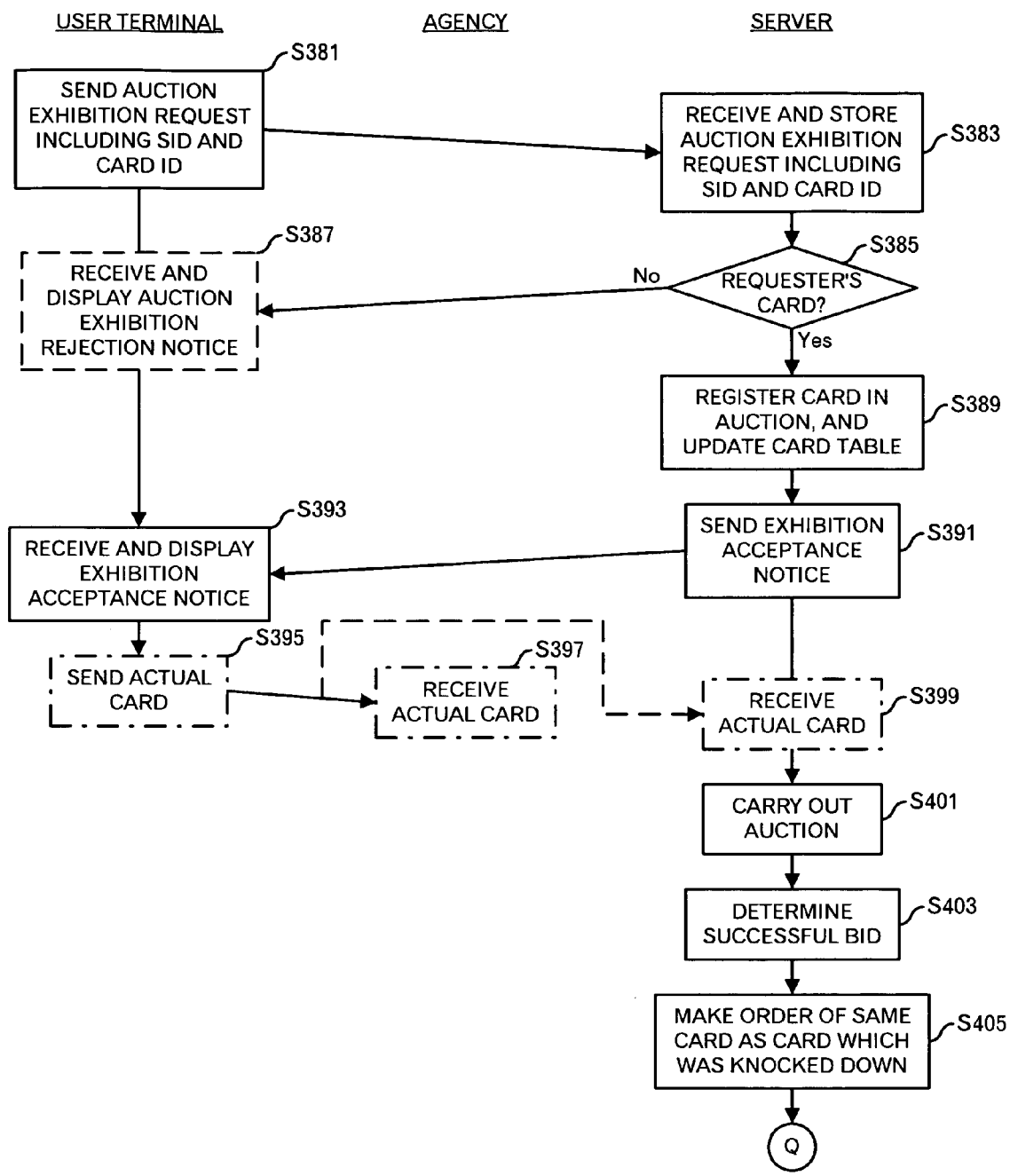
FIG. 28 is a diagram showing a processing flow for an auction in the embodiment of the present invention.

Next, a card auction, which is one of the functions of the virtual card trade market, will be described with reference to FIG. 28. In the following description, it is assumed that the user A exhibits a card on an auction and the user B makes a successful bid for the auction. The user A operates the cellular phone 3 to access an auction exhibition page of the server 5. When the user A inputs the card ID of a card to be exhibited on the auction into an input column of the auction exhibition page and instructs the submittal, the cellular phone 3 transmits an auction exhibition request containing the subscriber ID (SID) and the card ID to the server 5 (step S381). The card transfer processor 53 of the server 5 receives the auction exhibition request containing the subscriber ID and the card ID from the cellular phone 3, and temporarily stores the request into the storage device (step S383). Here, in order to check whether the exhibitor is a rightful card owner, it searches the card table 62 on the basis of the card ID, and judges whether the user ID registered in the column 627 of possessing user IDs is coincident with the user ID corresponding to the received SID or the received user ID (step S385). If both the user IDs are not coincident with each other, the exhibitor is about to exhibit a card of another person on an auction, and thus it transmits an auction exhibition rejection notice to the cellular phone 3. The cellular phone 3 receives the auction exhibition rejection notice from the server 5, and displays the notice on the display device (step S387).

On the other hand, if it is confirmed that an auction exhibition request is made by a rightful card owner, it stores the user ID of the exhibitor, the card ID, and the like in an auction data storage. Moreover, it changes the distribution status of the received card ID to "being exhibited on the auction" in the card table 62 (step S389). Thereafter, the card transfer processor 53 transmits an exhibition acceptance notice to the cellular phone 3 (step S391). The cellular phone 3 receives the exhibition acceptance notice from the server 5, and displays the notice on the display device (step S393).

The user A confirms it on the basis of the exhibition acceptance notice that his or her exhibition was accepted, and sends or brings the actual card to the registered dealing agency (step S395). The user A may send the actual card to the service provider. The registered dealing agency operates the agency computer 9 to obtain information of the distribution status from the card ID, confirms the state that the card is being exhibited on the auction and then receives the actual card (step S397). This card may be sent to the service provider or the game planning company. When the user A sends the card to be exhibited to the service provider, the service provider achieves the information of the distribution status from the card ID, confirms the state that the cars is being exhibited on the auction and the receives the actual card as in the case of the cellular phone agency (step S399).

In this embodiment, the card transfer processor 53 carries out a process for the auction (step S401). However, the process for the auction is the same as the conventional art, and thus the description thereof is omitted. In this case, it is assumed that there is a bidder and a successful bidder is settled (step S403). The successful bidder is frequently settled by the user A, and the process under this situation is the same as the conventional art. Therefore, the description of this process is also omitted. In this embodiment, the actual card is withdrawn from the user A, however, it is assumed that the actual card concerned is discarded and the same card is newly issued. Accordingly, at the time point when the successful bidder is settled, it transmits data to make an order of the same card or the same type of card as the card, which was knocked down, to the game planning company (step S405). The process shifts to FIG. 29 through a terminal Q. There is no problem for the successful bidder if it is the same type of card, not the same card.

Figure 29:
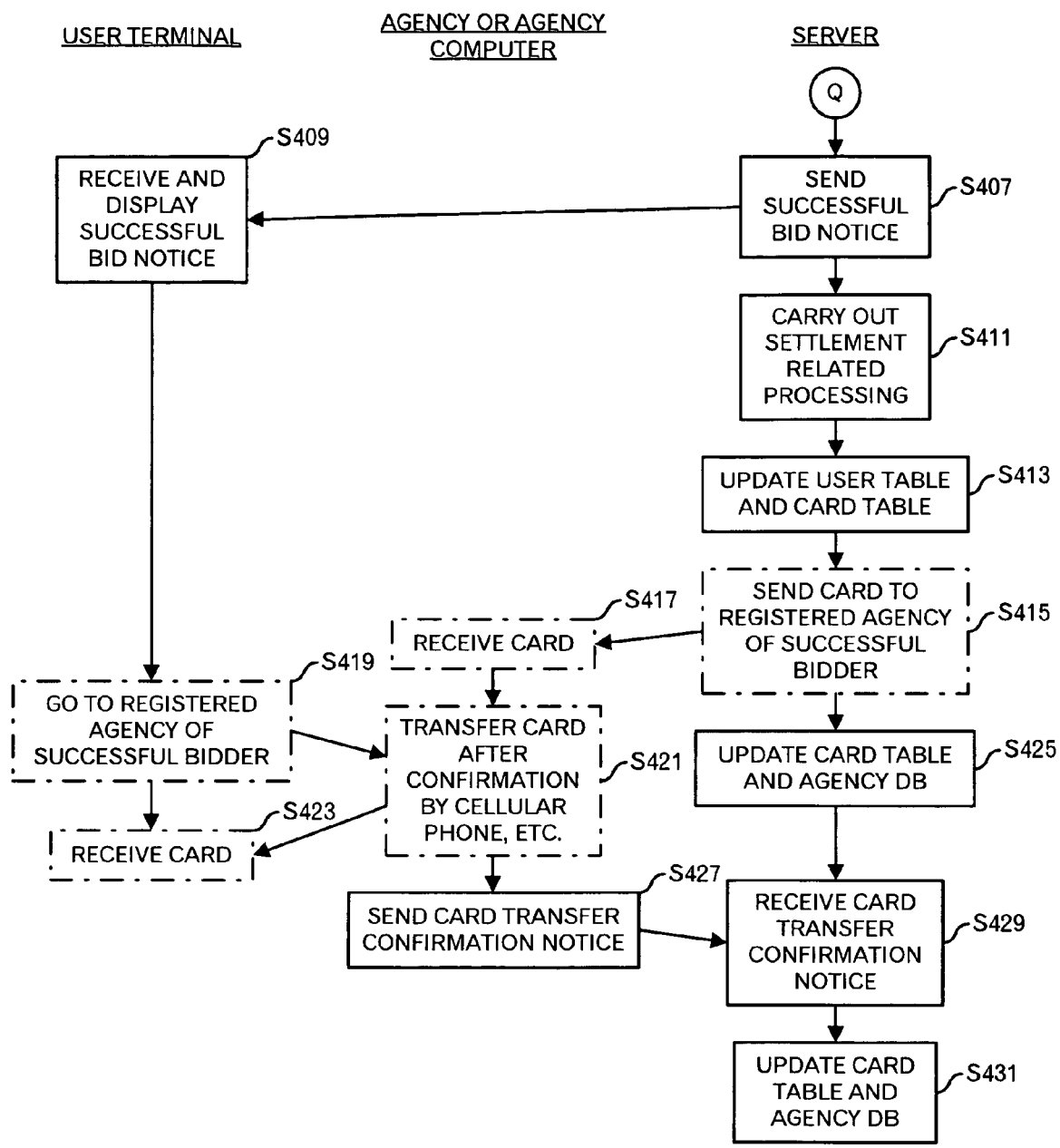
FIG. 29 is a diagram showing a processing flow for the auction in the embodiment of the present invention.

In FIG. 29, the card transfer processor 53 of the server 5 transmits a successful bid notice to the user B who is the successful bidder (step S407). The user B operates the cellular phone 4 to receive the successful bid notice and displays the notice on the display device (step S409). Accordingly, the user B can confirm that he or she is the successful bidder.

Moreover, the card transfer processor 53 of the server 5 carries out a settlement process (step S411). With respect to the settlement process of the card transfer cost, there are a case where it is carried out by the service provider and a case where it is carried out between the parties concerned. In the following description, it is assumed that the service provider carries out the settlement process. In this case, the user B who is the successful bidder is charged for the amount of money containing the card transfer cost and the auction utilizing fee, and the amount of money calculated by subtracting the service charge from the card transfer cost is paid to the user A. At this step, with respect to the user B, the card transfer cost and the auction utilizing fee are added to the current utilizing fee of the user B to register the addition result in the user table 61. Moreover, with respect to the user A, the amount of money calculated by subtracting the auction service charge from the card transfer cost is subtracted from the current utilizing fee of the user A to register the subtraction result in the user table 61.

Furthermore, the card transfer processor 53 deletes the card ID of the exhibited card from the possessed card IDs of the user A in the user table 61, and registers the card ID of the card, which was currently knocked down, or the card ID of a card to be newly issued in the possessed card IDs of the user B. Furthermore, in the card table 62, the possessing user ID of the exhibited card is changed to the user ID of the user B who is the successful bidder, or the record of the exhibited card is deleted and a record for the card to be newly issued is generated to register the user ID of the user B who is the successful bidder as the possessing user ID. In any case, the distribution status is set to "before issuance" (step S413).

The service provider or the game planning company sends the same card or the same type of card to the registered dealing agency of the user B to transfer the card concerned to the user B who is the successful bidder (step S415). At this stage, the card transfer processor 53 of the server 5 changes the distribution status of the card ID of the sent card to "before transfer" and registers the data in the card table 62. In the registered user table for the forwarding destination agency in the agency DB 64, it adds the card ID of the sent card to the column 654 of IDs of cards being held, which corresponds to the user ID of the successful bidder (step S425).

Moreover, the holding flag 653 is set to "Yes". The registered dealing agency of the user B receives the card thus sent (step S417), and waits for the user B coming to the store. The user B goes to the registered dealing agency (step S419), and the registered dealing agency transfers the card to the user B after checking the identification of the user B by the cellular phone 4 of the user B or the like and checking the card to be transferred (step S421). The user B can use the card on the network card game when receiving the card from the registered dealing agency (step S423).

The registered dealing agency of the user B operates the agency computer 9 to access the server 5 and make inputs for the card ID and the confirmation of the card transfer on the card transfer confirmation input page. The agency computer 9 transmits a card transfer confirmation notice containing the card ID to the server 5 (step S427). When receiving the card transfer confirmation notice containing the card ID from the agency computer 9 (step S429), the registration processor 52 of the server 5 changes the distribution status of the card in the card table 62 to "user holding", and deletes the received card ID from the holding card IDs in the registered user table of the agency DB 64 (step S431).

The auction is carried out through the process described above, so that the card dealing is activated and valuable cards are easily collected in card collection and game battles.

As described above, in the network card game, the card distribution such as transfer of cards can be activated between users, and it can be easy to keep their interests in cards. If the types of cards are gradually increased, the effect is more intensified. Furthermore, if the game rule itself is established, it is unnecessary to change the configuration in the server 5, and users are attracted with a relatively small cost. Moreover, the card game rule itself is not so complicated, and thus operation capability is not required. Therefore, users can continually enjoy games once they learn the rule. Furthermore, cards can be used as one of sales promotion tools for the cellular phone agency, and it is expected that the sale of cellular phones or the like is enhanced.

The embodiment of the present invention described above is mere an example, and the present invention is not limited to the above embodiment. For example, when the process using the cellular phone was described, the subscriber ID is used in place of the user ID. However, another computer may be used, and in this case, the logon is carried out with a user ID and a password. The configuration may be modified so that cookie is used. Moreover, the server 5 may be constructed so that it is not implemented by a single computer, but by plural computers. Furthermore, functions, which are not described above, may be added to provide more services.

Still furthermore, in the above embodiment, the card transfer service charge for the user is reduced by only a mail with advertisement when card transfer is carried out. However, it may be modified so that in order to reduce the card transfer service charge, the transfer destination user must respond to a questionnaire or the like.

What is claimed is:

1. A card management method for a network card game, comprising:

receiving a registration request of a card from a terminal of a user;

checking a registration state of said card relating to said registration request;

upon being judged that said registration state of said card relating to said registration request is an unregistered state of ownership, storing card identification information of said card relating to said registration request in association with user identification information of said user or said terminal of said user;

executing a process for a network card game using at least said card identification information of said card; and registering a state change of said card in accordance with a play state of said network card game, in a card information storage, wherein said state of said card includes a damage state, which has been stored in said card information storage and is cleared upon detecting transfer of an ownership of said card.

2. A card management method for a network card game, comprising:

receiving a transfer request of a card, which includes a designation of a transfer destination user, from a terminal of a user;

judging whether an association between identification information of said user or said terminal of said user and identification information of said card relating to said transfer request is registered in a storage device;

upon being judged that at least said association is registered, registering in said storage device, an association between identification information of said transfer destination user or a terminal of said transfer destination user and said identification information of said card relating to said transfer request; and clearing at least a part of card states having been registered in a card information storage in association with said card relating to said transfer request, wherein the cleared part of said card states is a play state of a network card game using said identification information of said card.

3. The card management method as set forth in claim 2, further comprising:

upon said registering, calculating a point value based on at least one of a number of cards relating to said transfer request, a level of said card, rarity of said card and card attribute, and storing the calculated point value or an accumulated point value into a user information storage in association with identification information of a transfer source user or a terminal of said transfer source user.

4. The card management method as set forth in claim 3, further comprising:

transmitting information according to the accumulated point value of each user to each said user.

5. The card management method as set forth in claim 2, further comprising:

upon said registering, storing a transfer source user, said transfer destination user, and information on date and time into a transfer management table.

6. The card management method as set forth in claim 5, further comprising:

extracting from said transfer management table, data representing that a same card is transferred between same users within a predetermined period.

7. The card management method as set forth in claim 2, further comprising:

registering information concerning a fee incurred when said registering has been carried out, in a management table for a registered dealing agency of a user who is charged said fee.

8. The card management method as set forth in claim 3, further comprising:

registering information concerning at least one of transfer of a privilege given by an exchange with said point value stored in said user information storage and transfer of a card, which is knocked down in a card auction, in a management table for a registered dealing agency of a user who obtained said privilege or a successful bidder.

9. A card management program embodied on a medium, for a network card game, comprising:

receiving a registration request of a card from a terminal of a user;

checking a registration state of said card relating to said registration request;

upon being judged that said registration state of said card relating to said registration request is an unregistered state of ownership, storing card identification information of said card relating to said registration request in association with user identification information of said user or said terminal of said user;

executing a process for a network card game using at least said card identification information of said card; and registering a state change of said card in accordance with a play state of said network card game, in a card information storage, wherein said state of said card includes a damage state, which has been stored in said card information storage and is cleared upon detecting transfer of an ownership of said card.

10. A card management program embodied on a medium, for a network card game, comprising:

receiving a transfer request of a card, which includes a designation of a transfer destination user, from a terminal of a user;

judging whether an association between identification information of said user or said terminal of said user and identification information of said card relating to said transfer request is registered in a storage device;

upon being judged that at least said association is registered, registering in said storage device, an association between identification information of said transfer destination user or a terminal of said transfer destination user and said identification information of said card relating to said transfer request; and clearing at least a part of card states having been registered in a card information storage in association with said card relating to said transfer request, wherein the cleared part of said card states is a play state of a network card game using said identification information of said card.

11. The card management program as set forth in claim 10, further comprising:

upon said registering, calculating a point value based on at least one of a number of cards relating to said transfer request, a level of said card, rarity of said card and card attribute, and storing the calculated point value or an accumulated point value into a user information storage in association with identification information of a transfer source user or a terminal of said transfer source user.

12. The card management program as set forth in claim 10, further comprising:

upon said registering, storing a transfer source user, said transfer destination user, and information on date and time into a transfer management table.

13. The card management program as set forth in claim 12, further comprising:

extracting from said transfer management table, data representing that a same card is transferred between same users within a predetermined period.

14. A card management apparatus for a network card game, comprising:

a unit that receives a registration request of a card from a terminal of a user;

a unit that checks a registration state of the card relating to said registration request;

a unit that stores card identification information of said card relating to said registration request in association with user identification information of said user or said terminal of said user, upon being judged that said registration state of said card relating to said registration request is an unregistered state of ownership;

a unit that executes a process for a network card game using at least said card identification information of said card; and a unit that registers a state change of said card in accordance with a play state of said network card game, in a card information storage, wherein said state of said card includes a damage state, which has been stored in said card information storage and is cleared upon detecting transfer of an ownership of said card.

15. A card management apparatus for a network card game, comprising:

a unit that receives a transfer request of a card, which includes a designation of a transfer destination user, from a terminal of a user;

a unit that judges whether an association between identification information of the user or the terminal of the user and identification information of said card relating to said transfer request is registered in a storage device;

a unit that registers in said storage device, an association between identification information of said transfer destination user or a terminal of said transfer destination user and said identification information of said card relating to said transfer request upon being judged that at least the association is registered,; and a unit that clears at least a part of card states having been registered in a card information storage in association with said card relating to said transfer request, wherein the cleared part of said card states is a play state of a network card game using said identification information of said card.

* * * * *

UNITED STATES PATENT AND TRADEMARK OFFICE
CERTIFICATE OF CORRECTION

PATENT NO. : 7,435,171 B2  Page 1 of 1
APPLICATION NO. : 11/002881
DATED : October 14, 2008
INVENTOR(S) : Motohiro Hanafusa It is certified that error appears in the above-identified patent and that said Letters Patent is hereby corrected as shown below:

Title page, Column 2 (Abstract), item 54 Line 5, change "In" to --in--.

Title page, Column 2 (Abstract), item 54 Line 7, change "cards" to --cards,--.

Title page, Column 2 (Abstract), item 54 Line 11, change "It" to --it--.

Column 36, Line 13, change "registered," to --registered--.

Signed and Sealed this

Twenty-seventh Day of January, 2009

JOHN DOLL
*Acting Director of the United States Patent and Trademark Office*